(12) United States Patent
Vorbach et al.

(10) Patent No.: US 8,127,061 B2
(45) Date of Patent: Feb. 28, 2012

(54) BUS SYSTEMS AND RECONFIGURATION METHODS

(76) Inventors: Martin Vorbach, Munich (DE); Volker Baumgarte, Munich (DE); Gerd Ehlers, Grassbrunn (DE)

( * ) Notice: Subject to any disclaimer, the term of this patent is extended or adjusted under 35 U.S.C. 154(b) by 1474 days.

(21) Appl. No.: 10/504,684

(22) PCT Filed: Feb. 18, 2003

(86) PCT No.: PCT/DE03/00489
§ 371 (c)(1),
(2), (4) Date: Jul. 14, 2006

(87) PCT Pub. No.: WO03/071432
PCT Pub. Date: Aug. 28, 2003

(65) Prior Publication Data
US 2007/0150637 A1 Jun. 28, 2007

(30) Foreign Application Priority Data

Feb. 18, 2002 (DE) .................................. 102 06 857
Aug. 27, 2002 (DE) .................................. 102 40 000

(51) Int. Cl.
*G06F 13/42* (2006.01)
*G06F 13/00* (2006.01)
*G06F 15/00* (2006.01)
*G06F 15/76* (2006.01)

(52) U.S. Cl. .......... 710/108; 710/106; 710/107; 712/10; 712/11

(58) Field of Classification Search .................. 710/100, 710/105–108, 110, 316–317, 200; 712/10–12, 712/15; 716/116, 117
See application file for complete search history.

(56) References Cited

U.S. PATENT DOCUMENTS

| 2,067,477 | A | 1/1937 | Cooper |
| 3,242,998 | A | 3/1966 | Gubbins |
| 3,564,506 | A | 2/1971 | Bee et al. |
| 3,681,578 | A | 8/1972 | Stevens |
| 3,753,008 | A | 8/1973 | Guarnaschelli |
| 3,757,608 | A | 9/1973 | Willner |
| 3,855,577 | A | 12/1974 | Vandierendonck |
| 4,151,611 | A | 4/1979 | Sugawara et al. |
| 4,233,667 | A | 11/1980 | Devine et al. |
| 4,414,547 | A | 11/1983 | Knapp et al. |
| 4,498,134 | A | 2/1985 | Hansen et al. |
| 4,498,172 | A | 2/1985 | Bhavsar |
| 4,566,102 | A | 1/1986 | Hefner |

(Continued)

FOREIGN PATENT DOCUMENTS

DE 42 21 278 1/1994

(Continued)

OTHER PUBLICATIONS

"The Free On-Line Dictionary of Computing". Entry 'handshaking'. Online Jan. 13, 1995. Retrieved from Internet Jan. 23, 2011. <http://foldoc.org/handshake>.*
Ohmsha, "Information Processing Handbook," edited by the Information Processing Society of Japan, pp. 376, Dec. 21, 1998.
Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.
Abnous et al., "Ultra-Low-Power Domain-Specific Multimedia Processors," U.C. Berkeley, 1996 IEEE, pp. 461-470.

(Continued)

*Primary Examiner* — Thomas J Cleary
(74) *Attorney, Agent, or Firm* — Kenyon & Kenyon LLP

(57) ABSTRACT

A processor chip includes data processing elements that each has dedicated to it a respective switch for dynamically establishing an interconnection between the data processing elements conditional upon verification of a validity of the interconnection, which verification is automatically performed by at least one of the data processing elements to be interconnected.

18 Claims, 18 Drawing Sheets

U.S. PATENT DOCUMENTS

| | | | |
|---|---|---|---|
| 4,571,736 A | 2/1986 | Agrawal et al. | |
| 4,590,583 A | 5/1986 | Miller | |
| 4,591,979 A | 5/1986 | Iwashita | |
| 4,594,682 A | 6/1986 | Drimak | |
| 4,663,706 A | 5/1987 | Allen et al. | |
| 4,667,190 A | 5/1987 | Fant et al. | |
| 4,682,284 A | 7/1987 | Schrofer | |
| 4,706,216 A | 11/1987 | Carter | |
| 4,720,778 A | 1/1988 | Hall et al. | |
| 4,720,780 A | 1/1988 | Dolecek | |
| 4,739,474 A | 4/1988 | Holsztynski | |
| 4,761,755 A | 8/1988 | Ardini et al. | |
| 4,791,603 A | 12/1988 | Henry | |
| 4,811,214 A | 3/1989 | Nosenchuck et al. | |
| 4,852,043 A | 7/1989 | Guest | |
| 4,852,048 A | 7/1989 | Morton | |
| 4,860,201 A | 8/1989 | Miranker et al. | |
| 4,870,302 A | 9/1989 | Freeman | |
| 4,873,666 A | 10/1989 | Lefebvre et al. | |
| 4,882,687 A | 11/1989 | Gordon | |
| 4,884,231 A | 11/1989 | Mor et al. | |
| 4,891,810 A | 1/1990 | de Corlieu et al. | |
| 4,901,268 A | 2/1990 | Judd | |
| 4,910,665 A | 3/1990 | Mattheyses et al. | |
| 4,918,440 A | 4/1990 | Furtek et al. | |
| 4,939,641 A | 7/1990 | Schwartz et al. | |
| 4,967,340 A | 10/1990 | Dawes | |
| 4,972,314 A | 11/1990 | Getzinger et al. | |
| 4,992,933 A | 2/1991 | Taylor | |
| 5,010,401 A | 4/1991 | Murakami et al. | |
| 5,014,193 A | 5/1991 | Garner et al. | |
| 5,015,884 A | 5/1991 | Agrawal et al. | |
| 5,021,947 A | 6/1991 | Campbell et al. | |
| 5,023,775 A | 6/1991 | Poret | |
| 5,034,914 A | 7/1991 | Osterlund | |
| 5,036,473 A | 7/1991 | Butts et al. | |
| 5,036,493 A | 7/1991 | Nielsen | |
| 5,041,924 A | 8/1991 | Blackborow et al. | |
| 5,043,978 A | 8/1991 | Nagler et al. | |
| 5,047,924 A | 9/1991 | Matsubara et al. | |
| 5,055,997 A | 10/1991 | Sluijter et al. | |
| 5,065,308 A | 11/1991 | Evans | |
| 5,072,178 A | 12/1991 | Matsumoto | |
| 5,081,375 A | 1/1992 | Pickett et al. | |
| 5,099,447 A | 3/1992 | Myszewski | |
| 5,103,311 A | 4/1992 | Sluijter et al. | |
| 5,109,503 A | 4/1992 | Cruickshank et al. | |
| 5,113,498 A | 5/1992 | Evan et al. | |
| 5,115,510 A | 5/1992 | Okamoto et al. | |
| 5,119,290 A | 6/1992 | Loo et al. | |
| 5,123,109 A | 6/1992 | Hillis | |
| 5,125,801 A | 6/1992 | Nabity et al. | |
| 5,128,559 A | 7/1992 | Steele | |
| 5,142,469 A | 8/1992 | Weisenborn | |
| 5,144,166 A | 9/1992 | Camarota et al. | |
| 5,193,202 A | 3/1993 | Jackson et al. | |
| 5,203,005 A | 4/1993 | Horst | |
| 5,204,935 A | 4/1993 | Mihara et al. | |
| 5,208,491 A | 5/1993 | Ebeling et al. | |
| 5,212,716 A | 5/1993 | Ferraiolo et al. | |
| 5,212,777 A | 5/1993 | Gove et al. | |
| 5,218,302 A | 6/1993 | Loewe et al. | |
| 5,226,122 A | 7/1993 | Thayer et al. | |
| RE34,363 E | 8/1993 | Freeman | |
| 5,233,539 A | 8/1993 | Agrawal et al. | |
| 5,237,686 A | 8/1993 | Asano et al. | |
| 5,243,238 A | 9/1993 | Kean | |
| 5,247,689 A | 9/1993 | Ewert | |
| RE34,444 E | 11/1993 | Kaplinsky | |
| 5,274,593 A | 12/1993 | Proebsting | |
| 5,276,836 A | 1/1994 | Fukumaru et al. | |
| 5,287,472 A | 2/1994 | Horst | |
| 5,287,511 A | 2/1994 | Robinson et al. | |
| 5,287,532 A | 2/1994 | Hunt | |
| 5,294,119 A | 3/1994 | Vincent et al. | |
| 5,301,284 A | 4/1994 | Estes et al. | |
| 5,301,344 A | 4/1994 | Kolchinsky | |
| 5,303,172 A | 4/1994 | Magar et al. | |
| 5,311,079 A | 5/1994 | Ditlow et al. | |
| 5,327,125 A | 7/1994 | Iwase et al. | |
| 5,336,950 A | 8/1994 | Popli et al. | |
| 5,343,406 A | 8/1994 | Freeman et al. | |
| 5,347,639 A | 9/1994 | Rechtschaffen et al. | |
| 5,349,193 A | 9/1994 | Mott et al. | |
| 5,353,432 A | 10/1994 | Richek et al. | |
| 5,355,508 A | 10/1994 | Kan | |
| 5,361,373 A | 11/1994 | Gilson | |
| 5,365,125 A | 11/1994 | Goetting et al. | |
| 5,379,444 A | 1/1995 | Mumme | |
| 5,386,154 A | 1/1995 | Goetting et al. | |
| 5,386,518 A | 1/1995 | Reagle et al. | |
| 5,392,437 A | 2/1995 | Matter et al. | |
| 5,410,723 A * | 4/1995 | Schmidt et al. | 712/18 |
| 5,412,795 A | 5/1995 | Larson | |
| 5,418,952 A | 5/1995 | Morley et al. | |
| 5,418,953 A | 5/1995 | Hunt et al. | |
| 5,421,019 A | 5/1995 | Holsztynski et al. | |
| 5,422,823 A | 6/1995 | Agrawal et al. | |
| 5,425,036 A | 6/1995 | Liu et al. | |
| 5,426,378 A | 6/1995 | Ong | |
| 5,428,526 A | 6/1995 | Flood et al. | |
| 5,430,687 A | 7/1995 | Hung et al. | |
| 5,435,000 A | 7/1995 | Boothroyd et al. | |
| 5,440,245 A | 8/1995 | Galbraith et al. | |
| 5,440,538 A | 8/1995 | Olsen et al. | |
| 5,442,790 A | 8/1995 | Nosenchuck | |
| 5,444,394 A | 8/1995 | Watson et al. | |
| 5,448,186 A | 9/1995 | Kawata | |
| 5,450,022 A | 9/1995 | New | |
| 5,455,525 A | 10/1995 | Ho et al. | |
| 5,457,644 A | 10/1995 | McCollum | |
| 5,465,375 A | 11/1995 | Thepaut et al. | |
| 5,469,003 A | 11/1995 | Kean | |
| 5,473,266 A | 12/1995 | Ahanin et al. | |
| 5,473,267 A | 12/1995 | Stansfield | |
| 5,475,583 A | 12/1995 | Bock et al. | |
| 5,475,803 A | 12/1995 | Stearns et al. | |
| 5,475,856 A | 12/1995 | Kogge | |
| 5,483,620 A | 1/1996 | Pechanek et al. | |
| 5,485,103 A | 1/1996 | Pedersen et al. | |
| 5,485,104 A | 1/1996 | Agrawal et al. | |
| 5,489,857 A | 2/1996 | Agrawal et al. | |
| 5,491,353 A | 2/1996 | Kean | |
| 5,493,239 A | 2/1996 | Zlotnick | |
| 5,493,663 A | 2/1996 | Parikh | |
| 5,497,498 A | 3/1996 | Taylor | |
| 5,504,439 A | 4/1996 | Tavana | |
| 5,506,998 A | 4/1996 | Kato et al. | |
| 5,510,730 A | 4/1996 | El Gamal et al. | |
| 5,511,173 A | 4/1996 | Yamaura et al. | |
| 5,513,366 A | 4/1996 | Agarwal et al. | |
| 5,521,837 A | 5/1996 | Frankle et al. | |
| 5,522,083 A | 5/1996 | Gove et al. | |
| 5,525,971 A | 6/1996 | Flynn | |
| 5,530,873 A | 6/1996 | Takano | |
| 5,530,946 A | 6/1996 | Bouvier et al. | |
| 5,532,693 A | 7/1996 | Winters et al. | |
| 5,532,957 A | 7/1996 | Malhi | |
| 5,535,406 A | 7/1996 | Kolchinsky | |
| 5,537,057 A | 7/1996 | Leong et al. | |
| 5,537,580 A | 7/1996 | Giomi et al. | |
| 5,537,601 A | 7/1996 | Kimura et al. | |
| 5,541,530 A | 7/1996 | Cliff et al. | |
| 5,544,336 A | 8/1996 | Kato et al. | |
| 5,548,773 A | 8/1996 | Kemeny et al. | |
| 5,550,782 A | 8/1996 | Cliff et al. | |
| 5,555,434 A | 9/1996 | Carlstedt | |
| 5,559,450 A | 9/1996 | Ngai et al. | |
| 5,561,738 A | 10/1996 | Kinerk et al. | |
| 5,568,624 A | 10/1996 | Sites et al. | |
| 5,570,040 A | 10/1996 | Lytle et al. | |
| 5,572,710 A | 11/1996 | Asano et al. | |
| 5,574,927 A | 11/1996 | Scantlin | |
| 5,574,930 A | 11/1996 | Halverson, Jr. et al. | |
| 5,581,731 A | 12/1996 | King et al. | |
| 5,581,734 A | 12/1996 | DiBrino et al. | |
| 5,583,450 A | 12/1996 | Trimberger et al. | |

| Patent No. | Date | Inventor(s) | Patent No. | Date | Inventor(s) |
|---|---|---|---|---|---|
| 5,584,013 A | 12/1996 | Cheong et al. | 5,832,288 A | 11/1998 | Wong |
| 5,586,044 A | 12/1996 | Agrawal et al. | 5,838,165 A | 11/1998 | Chatter |
| 5,587,921 A | 12/1996 | Agrawal et al. | 5,838,988 A | 11/1998 | Panwar et al. |
| 5,588,152 A | 12/1996 | Dapp et al. | 5,841,973 A | 11/1998 | Kessler et al. |
| 5,590,345 A | 12/1996 | Barker et al. | 5,844,422 A | 12/1998 | Trimberger et al. |
| 5,590,348 A | 12/1996 | Phillips et al. | 5,844,888 A | 12/1998 | Markkula, Jr. et al. |
| 5,596,742 A | 1/1997 | Agarwal et al. | 5,848,238 A | 12/1998 | Shimomura et al. |
| 5,600,265 A | 2/1997 | El Gamal Abbas et al. | 5,854,918 A | 12/1998 | Baxter |
| 5,600,597 A | 2/1997 | Kean et al. | 5,857,097 A | 1/1999 | Henzinger et al. |
| 5,600,845 A | 2/1997 | Gilson | 5,857,109 A | 1/1999 | Taylor |
| 5,606,698 A | 2/1997 | Powell | 5,859,544 A | 1/1999 | Norman |
| 5,608,342 A | 3/1997 | Trimberger | 5,862,403 A | 1/1999 | Kanai et al. |
| 5,611,049 A | 3/1997 | Pitts | 5,865,239 A | 2/1999 | Carr |
| 5,617,547 A | 4/1997 | Feeney et al. | 5,867,691 A | 2/1999 | Shiraishi |
| 5,617,577 A | 4/1997 | Barker et al. | 5,867,723 A | 2/1999 | Peters et al. |
| 5,619,720 A | 4/1997 | Garde et al. | 5,870,620 A | 2/1999 | Kadosumi et al. |
| 5,625,806 A | 4/1997 | Kromer | 5,884,075 A | 3/1999 | Hester et al. |
| 5,625,836 A | 4/1997 | Barker et al. | 5,887,162 A | 3/1999 | Williams et al. |
| 5,634,131 A | 5/1997 | Matter et al. | 5,887,165 A | 3/1999 | Martel et al. |
| 5,635,851 A | 6/1997 | Tavana | 5,889,533 A | 3/1999 | Lee |
| 5,642,058 A | 6/1997 | Trimberger et al. | 5,889,982 A | 3/1999 | Rodgers et al. |
| 5,646,544 A | 7/1997 | Iadanza | 5,892,370 A | 4/1999 | Eaton et al. |
| 5,646,545 A | 7/1997 | Trimberger et al. | 5,892,961 A | 4/1999 | Trimberger |
| 5,649,176 A | 7/1997 | Selvidge et al. | 5,892,962 A | 4/1999 | Cloutier |
| 5,649,179 A | 7/1997 | Steenstra et al. | 5,894,565 A | 4/1999 | Furtek et al. |
| 5,652,529 A | 7/1997 | Gould et al. | 5,898,602 A | 4/1999 | Rothman et al. |
| 5,652,894 A | 7/1997 | Hu et al. | 5,901,279 A | 5/1999 | Davis, III |
| 5,655,069 A | 8/1997 | Ogawara et al. | 5,915,099 A | 6/1999 | Takata et al. |
| 5,655,124 A | 8/1997 | Lin | 5,915,123 A | 6/1999 | Mirsky et al. |
| 5,656,950 A | 8/1997 | Duong et al. | 5,924,119 A | 7/1999 | Sindhu et al. |
| 5,657,330 A | 8/1997 | Matsumoto | 5,926,638 A | 7/1999 | Inoue |
| 5,658,797 A | 8/1997 | Zanveld et al. | 5,927,423 A | 7/1999 | Wada et al. |
| 5,659,785 A | 8/1997 | Pechanek et al. | 5,933,023 A | 8/1999 | Young |
| 5,659,797 A | 8/1997 | Zandveld et al. | 5,933,642 A | 8/1999 | Baxter et al. |
| 5,675,262 A | 10/1997 | Duong et al. | 5,936,424 A | 8/1999 | Young et al. |
| 5,675,743 A | 10/1997 | Mavity | 5,943,242 A | 8/1999 | Vorbach et al. |
| 5,675,777 A | 10/1997 | Glickman | 5,956,518 A | 9/1999 | DeHon et al. |
| 5,680,583 A | 10/1997 | Kuijsten | 5,960,193 A | 9/1999 | Guttag et al. |
| 5,682,491 A | 10/1997 | Pechanek et al. | 5,960,200 A | 9/1999 | Eager et al. |
| 5,687,325 A | 11/1997 | Chang | 5,966,143 A | 10/1999 | Breternitz, Jr. |
| 5,694,602 A | 12/1997 | Smith | 5,966,534 A | 10/1999 | Cooke et al. |
| 5,696,976 A | 12/1997 | Nizar et al. | 5,970,254 A | 10/1999 | Cooke et al. |
| 5,701,091 A | 12/1997 | Kean | 5,978,260 A | 11/1999 | Trimberger et al. |
| 5,705,938 A | 1/1998 | Kean | 5,978,583 A | 11/1999 | Ekanadham et al. |
| 5,713,037 A | 1/1998 | Wilkinson et al. | 5,996,048 A | 11/1999 | Cherabuddi et al. |
| 5,717,890 A | 2/1998 | Ichida et al. | 5,996,083 A | 11/1999 | Gupta et al. |
| 5,717,943 A | 2/1998 | Barker et al. | 5,999,990 A | 12/1999 | Sharrit et al. |
| 5,732,209 A | 3/1998 | Vigil et al. | 6,003,143 A | 12/1999 | Kim et al. |
| 5,734,869 A | 3/1998 | Chen | 6,011,407 A | 1/2000 | New |
| 5,734,921 A | 3/1998 | Dapp et al. | 6,014,509 A | 1/2000 | Furtek et al. |
| 5,737,516 A | 4/1998 | Circello et al. | 6,020,758 A | 2/2000 | Patel et al. |
| 5,737,565 A | 4/1998 | Mayfield | 6,020,760 A | 2/2000 | Sample et al. |
| 5,742,180 A | 4/1998 | Detton et al. | 6,021,490 A | 2/2000 | Vorbach et al. |
| 5,748,872 A | 5/1998 | Norman | 6,023,564 A | 2/2000 | Trimberger |
| 5,748,979 A | 5/1998 | Trimberger | 6,023,742 A | 2/2000 | Ebeling et al. |
| 5,752,035 A | 5/1998 | Trimberger | 6,026,481 A | 2/2000 | New et al. |
| 5,754,459 A | 5/1998 | Telikepalli | 6,034,538 A | 3/2000 | Abramovici |
| 5,754,820 A | 5/1998 | Yamagami | 6,035,371 A | 3/2000 | Magloire |
| 5,754,827 A | 5/1998 | Barbier et al. | 6,038,650 A | 3/2000 | Vorbach et al. |
| 5,754,871 A | 5/1998 | Wilkinson et al. | 6,038,656 A | 3/2000 | Cummings et al. |
| 5,760,602 A | 6/1998 | Tan | 6,044,030 A | 3/2000 | Zheng et al. |
| 5,761,484 A | 6/1998 | Agarwal et al. | 6,047,115 A | 4/2000 | Mohan et al. |
| 5,773,994 A | 6/1998 | Jones | 6,049,222 A | 4/2000 | Lawman |
| 5,778,439 A | 7/1998 | Trimberger et al. | 6,052,773 A | 4/2000 | DeHon et al. |
| 5,781,756 A | 7/1998 | Hung | 6,054,873 A | 4/2000 | Laramie |
| 5,784,630 A | 7/1998 | Saito et al. | 6,058,469 A | 5/2000 | Baxter |
| 5,784,636 A | 7/1998 | Rupp | 6,077,315 A | 6/2000 | Greenbaum et al. |
| 5,794,059 A | 8/1998 | Barker et al. | 6,078,736 A | 6/2000 | Guccione |
| 5,794,062 A | 8/1998 | Baxter | 6,081,903 A | 6/2000 | Vorbach et al. |
| 5,801,547 A | 9/1998 | Kean | 6,084,429 A | 7/2000 | Trimberger |
| 5,801,715 A | 9/1998 | Norman | 6,085,317 A | 7/2000 | Smith |
| 5,801,958 A | 9/1998 | Dangelo et al. | 6,086,628 A | 7/2000 | Dave et al. |
| 5,802,290 A | 9/1998 | Casselman | 6,088,795 A | 7/2000 | Vorbach et al. |
| 5,815,004 A | 9/1998 | Trimberger et al. | 6,092,174 A | 7/2000 | Roussakov |
| 5,815,715 A | 9/1998 | Kayhan | 6,096,091 A | 8/2000 | Hartmann |
| 5,821,774 A | 10/1998 | Veytsman et al. | 6,105,105 A | 8/2000 | Trimberger |
| 5,828,229 A | 10/1998 | Cliff et al. | 6,105,106 A | 8/2000 | Manning |
| 5,828,858 A | 10/1998 | Athanas et al. | 6,108,760 A | 8/2000 | Mirsky et al. |
| 5,831,448 A | 11/1998 | Kean | 6,119,181 A | 9/2000 | Vorbach et al. |

| | | | |
|---|---|---|---|
| 6,122,719 A | 9/2000 | Mirsky et al. | |
| 6,125,408 A | 9/2000 | McGee et al. | |
| 6,127,908 A | 10/2000 | Bozler et al. | |
| 6,128,720 A | 10/2000 | Pechanek et al. | |
| 6,131,149 A | 10/2000 | Nguyen | |
| 6,134,166 A | 10/2000 | Lytle et al. | |
| 6,137,307 A | 10/2000 | Iwanczuk et al. | |
| 6,145,072 A | 11/2000 | Shams et al. | |
| 6,150,837 A | 11/2000 | Beal et al. | |
| 6,150,839 A | 11/2000 | New et al. | |
| 6,154,048 A | 11/2000 | Iwanczuk et al. | |
| 6,154,049 A | 11/2000 | New | |
| 6,154,826 A | 11/2000 | Wulf et al. | |
| 6,157,214 A | 12/2000 | Marshall | |
| 6,170,051 B1 | 1/2001 | Dowling | |
| 6,172,520 B1 | 1/2001 | Lawman et al. | |
| 6,173,419 B1 | 1/2001 | Barnett | |
| 6,173,434 B1 | 1/2001 | Wirthlin et al. | |
| 6,178,494 B1 | 1/2001 | Casselman | |
| 6,185,256 B1 | 2/2001 | Saito et al. | |
| 6,185,731 B1 | 2/2001 | Maeda et al. | |
| 6,188,240 B1 | 2/2001 | Nakaya | |
| 6,198,304 B1 | 3/2001 | Sasaki | |
| 6,201,406 B1 | 3/2001 | Iwanczuk et al. | |
| 6,202,182 B1 | 3/2001 | Abramovici et al. | |
| 6,204,687 B1 | 3/2001 | Schultz et al. | |
| 6,211,697 B1 | 4/2001 | Lien et al. | |
| 6,212,544 B1 | 4/2001 | Borkenhagen et al. | |
| 6,212,650 B1 | 4/2001 | Guccione | |
| 6,215,326 B1 | 4/2001 | Jefferson et al. | |
| 6,216,223 B1 | 4/2001 | Revilla et al. | |
| 6,219,833 B1 | 4/2001 | Solomon et al. | |
| RE37,195 E | 5/2001 | Kean | |
| 6,230,307 B1 | 5/2001 | Davis et al. | |
| 6,240,502 B1 | 5/2001 | Panwar et al. | |
| 6,243,808 B1 | 6/2001 | Wang | |
| 6,252,792 B1 | 6/2001 | Marshall et al. | |
| 6,256,724 B1 | 7/2001 | Hocevar et al. | |
| 6,260,114 B1 | 7/2001 | Schug | |
| 6,260,179 B1 | 7/2001 | Ohsawa et al. | |
| 6,262,908 B1 | 7/2001 | Marshall et al. | |
| 6,263,430 B1 | 7/2001 | Trimberger et al. | |
| 6,266,760 B1 | 7/2001 | DeHon et al. | |
| 6,279,077 B1 | 8/2001 | Nasserbakht et al. | |
| 6,282,627 B1 | 8/2001 | Wong et al. | |
| 6,282,701 B1 | 8/2001 | Wygodny et al. | |
| 6,285,624 B1 | 9/2001 | Chen | |
| 6,286,134 B1 | 9/2001 | Click, Jr. et al. | |
| 6,288,566 B1 | 9/2001 | Hanrahan et al. | |
| 6,289,440 B1 | 9/2001 | Casselman | |
| 6,298,043 B1 * | 10/2001 | Mauger et al. | 370/248 |
| 6,298,396 B1 | 10/2001 | Loyer et al. | |
| 6,298,472 B1 | 10/2001 | Phillips et al. | |
| 6,301,706 B1 | 10/2001 | Maslennikov et al. | |
| 6,311,200 B1 | 10/2001 | Hanrahan et al. | |
| 6,311,265 B1 | 10/2001 | Beckerle et al. | |
| 6,321,298 B1 | 11/2001 | Hubis | |
| 6,321,366 B1 | 11/2001 | Tseng et al. | |
| 6,321,373 B1 | 11/2001 | Ekanadham et al. | |
| 6,338,106 B1 | 1/2002 | Vorbach et al. | |
| 6,339,840 B1 * | 1/2002 | Kothari et al. | 717/149 |
| 6,341,318 B1 | 1/2002 | Dakhil | |
| 6,347,346 B1 | 2/2002 | Taylor | |
| 6,349,346 B1 | 2/2002 | Hanrahan et al. | |
| 6,353,841 B1 | 3/2002 | Marshall et al. | |
| 6,362,650 B1 | 3/2002 | New et al. | |
| 6,370,596 B1 | 4/2002 | Dakhil | |
| 6,373,779 B1 | 4/2002 | Pang et al. | |
| 6,374,286 B1 | 4/2002 | Gee | |
| 6,378,068 B1 | 4/2002 | Foster et al. | |
| 6,381,624 B1 | 4/2002 | Colon-Bonet et al. | |
| 6,389,379 B1 | 5/2002 | Lin et al. | |
| 6,389,579 B1 | 5/2002 | Phillips et al. | |
| 6,392,912 B1 | 5/2002 | Hanrahan et al. | |
| 6,398,383 B1 | 6/2002 | Huang | |
| 6,400,601 B1 | 6/2002 | Sudo et al. | |
| 6,404,224 B1 | 6/2002 | Azegami et al. | |
| 6,405,185 B1 | 6/2002 | Pechanek et al. | |
| 6,405,299 B1 * | 6/2002 | Vorbach et al. | 712/11 |
| 6,421,808 B1 | 7/2002 | McGeer et al. | |
| 6,421,809 B1 | 7/2002 | Wuytack et al. | |
| 6,421,817 B1 | 7/2002 | Mohan et al. | |
| 6,425,054 B1 | 7/2002 | Nguyen | |
| 6,425,068 B1 | 7/2002 | Vorbach et al. | |
| 6,427,156 B1 | 7/2002 | Chapman et al. | |
| 6,430,309 B1 | 8/2002 | Pressman et al. | |
| 6,434,642 B1 | 8/2002 | Camilleri et al. | |
| 6,434,672 B1 | 8/2002 | Gaither | |
| 6,434,695 B1 | 8/2002 | Esfahani et al. | |
| 6,434,699 B1 | 8/2002 | Jones et al. | |
| 6,437,441 B1 | 8/2002 | Yamamoto | |
| 6,438,747 B1 | 8/2002 | Schreiber et al. | |
| 6,449,283 B1 * | 9/2002 | Chao et al. | 370/461 |
| 6,457,116 B1 | 9/2002 | Mirsky et al. | |
| 6,476,634 B1 | 11/2002 | Bilski | |
| 6,477,643 B1 | 11/2002 | Vorbach et al. | |
| 6,480,937 B1 | 11/2002 | Vorbach et al. | |
| 6,480,954 B2 | 11/2002 | Trimberger et al. | |
| 6,487,709 B1 | 11/2002 | Keller et al. | |
| 6,490,695 B1 | 12/2002 | Zagorski et al. | |
| 6,496,902 B1 | 12/2002 | Faanes et al. | |
| 6,496,971 B1 | 12/2002 | Lesea et al. | |
| 6,504,398 B1 | 1/2003 | Lien et al. | |
| 6,507,947 B1 | 1/2003 | Schreiber et al. | |
| 6,512,804 B1 | 1/2003 | Johnson et al. | |
| 6,513,077 B2 | 1/2003 | Vorbach et al. | |
| 6,516,382 B2 | 2/2003 | Manning | |
| 6,518,787 B1 | 2/2003 | Allegrucci et al. | |
| 6,519,674 B1 | 2/2003 | Lam et al. | |
| 6,523,107 B1 | 2/2003 | Stansfield et al. | |
| 6,525,678 B1 | 2/2003 | Veenstra et al. | |
| 6,526,520 B1 | 2/2003 | Vorbach et al. | |
| 6,538,468 B1 | 3/2003 | Moore | |
| 6,539,415 B1 | 3/2003 | Mercs | |
| 6,539,438 B1 | 3/2003 | Ledzius et al. | |
| 6,539,477 B1 | 3/2003 | Seawright | |
| 6,542,394 B2 | 4/2003 | Marshall et al. | |
| 6,542,844 B1 | 4/2003 | Hanna | |
| 6,542,998 B1 | 4/2003 | Vorbach et al. | |
| 6,553,395 B2 | 4/2003 | Marshall et al. | |
| 6,567,834 B1 | 5/2003 | Marshall et al. | |
| 6,571,381 B1 | 5/2003 | Vorbach et al. | |
| 6,587,939 B1 | 7/2003 | Takano | |
| 6,606,704 B1 | 8/2003 | Adiletta et al. | |
| 6,624,819 B1 | 9/2003 | Lewis | |
| 6,631,487 B1 | 10/2003 | Abramovici et al. | |
| 6,633,181 B1 | 10/2003 | Rupp | |
| 6,657,457 B1 | 12/2003 | Hanrahan et al. | |
| 6,658,564 B1 | 12/2003 | Smith et al. | |
| 6,668,237 B1 | 12/2003 | Guccione et al. | |
| 6,681,388 B1 | 1/2004 | Sato et al. | |
| 6,687,788 B1 | 2/2004 | Vorbach et al. | |
| 6,697,979 B1 | 2/2004 | Vorbach et al. | |
| 6,704,816 B1 | 3/2004 | Burke | |
| 6,708,325 B2 | 3/2004 | Cooke et al. | |
| 6,717,436 B2 | 4/2004 | Kress et al. | |
| 6,721,830 B2 | 4/2004 | Vorbach et al. | |
| 6,725,334 B2 | 4/2004 | Barroso et al. | |
| 6,728,871 B1 | 4/2004 | Vorbach et al. | |
| 6,754,805 B1 | 6/2004 | Juan | |
| 6,757,847 B1 | 6/2004 | Farkash et al. | |
| 6,757,892 B1 | 6/2004 | Gokhale et al. | |
| 6,782,445 B1 | 8/2004 | Olgiati et al. | |
| 6,785,826 B1 | 8/2004 | Durham et al. | |
| 6,803,787 B1 | 10/2004 | Wicker, Jr. | |
| 6,804,752 B2 | 10/2004 | Patterson et al. | |
| 6,820,188 B2 | 11/2004 | Stansfield et al. | |
| 6,829,697 B1 | 12/2004 | Davis et al. | |
| 6,836,842 B1 | 12/2004 | Guccione et al. | |
| 6,847,370 B2 | 1/2005 | Baldwin et al. | |
| 6,859,869 B1 | 2/2005 | Vorbach | |
| 6,868,476 B2 | 3/2005 | Rosenbluth et al. | |
| 6,871,341 B1 | 3/2005 | Shyr | |
| 6,874,108 B1 | 3/2005 | Abramovici et al. | |
| 6,886,092 B1 | 4/2005 | Douglass et al. | |
| 6,901,502 B2 | 5/2005 | Yano et al. | |
| 6,928,523 B2 | 8/2005 | Yamada | |
| 6,961,924 B2 | 11/2005 | Bates et al. | |

| | | | | | | |
|---|---|---|---|---|---|---|
| 6,975,138 | B2 | 12/2005 | Pani et al. | DE | 196 54 846 | 7/1998 |
| 6,977,649 | B1 | 12/2005 | Baldwin et al. | DE | 197 04 044 | 8/1998 |
| 7,000,161 | B1 | 2/2006 | Allen et al. | DE | 197 04 728 | 8/1998 |
| 7,007,096 | B1 | 2/2006 | Lisitsa et al. | DE | 197 04 742 | 9/1998 |
| 7,010,687 | B2 | 3/2006 | Ichimura | DE | 198 22 776 | 3/1999 |
| 7,036,114 | B2 | 4/2006 | McWilliams et al. | DE | 198 07 872 | 8/1999 |
| 7,038,952 | B1 | 5/2006 | Zack et al. | DE | 198 61 088 | 2/2000 |
| 7,210,129 | B2 | 4/2007 | May et al. | DE | 199 26 538 | 12/2000 |
| 7,216,204 | B2 | 5/2007 | Rosenbluth et al. | DE | 100 28 397 | 12/2001 |
| 7,237,087 | B2 | 6/2007 | Vorbach et al. | DE | 100 36 627 | 2/2002 |
| 7,249,351 | B1 | 7/2007 | Songer et al. | DE | 101 29 237 | 4/2002 |
| 7,254,649 | B2 | 8/2007 | Subramanian et al. | DE | 102 04 044 | 8/2003 |
| 7,340,596 | B1 | 3/2008 | Crosland et al. | EP | 0 208 457 | 1/1986 |
| 7,350,178 | B1 | 3/2008 | Crosland et al. | EP | 0 221 360 | 5/1987 |
| 7,382,156 | B2 | 6/2008 | Pani et al. | EP | 0 398 552 | 11/1990 |
| 7,657,877 | B2 | 2/2010 | Vorbach et al. | EP | 0 428 327 | 5/1991 |
| 7,759,968 | B1 | 7/2010 | Hussein et al. | EP | 0 463 721 | 1/1992 |
| 7,873,811 | B1 | 1/2011 | Wolinski et al. | EP | 0 477 809 | 4/1992 |
| 2001/0001860 | A1 | 5/2001 | Beiu | EP | 0 485 690 | 5/1992 |
| 2001/0010074 | A1 | 7/2001 | Nishihara et al. | EP | 0 497 029 | 8/1992 |
| 2001/0018733 | A1 | 8/2001 | Fujii et al. | EP | 0 539 595 | 5/1993 |
| 2001/0032305 | A1 | 10/2001 | Barry | EP | 0 638 867 A2 | 8/1994 |
| 2002/0010853 | A1 | 1/2002 | Trimberger et al. | EP | 0 628 917 | 12/1994 |
| 2002/0013861 | A1 | 1/2002 | Adiletta et al. | EP | 0 678 985 | 10/1995 |
| 2002/0038414 | A1 | 3/2002 | Taylor et al. | EP | 0 686 915 | 12/1995 |
| 2002/0045952 | A1 | 4/2002 | Blemel | EP | 0 707 269 | 4/1996 |
| 2002/0073282 | A1 | 6/2002 | Chauvel et al. | EP | 0 735 685 | 10/1996 |
| 2002/0083308 | A1 | 6/2002 | Pereira et al. | EP | 0 835 685 | 10/1996 |
| 2002/0099759 | A1 | 7/2002 | Gootherts | EP | 0 746 106 | 12/1996 |
| 2002/0103839 | A1 | 8/2002 | Ozawa | EP | 0 748 051 | 12/1996 |
| 2002/0124238 | A1 | 9/2002 | Metzgen | EP | 0 726 532 | 7/1998 |
| 2002/0138716 | A1 | 9/2002 | Master et al. | EP | 0 926 594 | 6/1999 |
| 2002/0143505 | A1 | 10/2002 | Drusinsky | EP | 1 102 674 | 7/1999 |
| 2002/0144229 | A1 | 10/2002 | Hanrahan | EP | 1 061 439 | 12/2000 |
| 2002/0152060 | A1 | 10/2002 | Tseng | EP | 1 115 204 | 7/2001 |
| 2002/0165886 | A1 | 11/2002 | Lam | EP | 1 146 432 | 10/2001 |
| 2003/0001615 | A1 | 1/2003 | Sueyoshi et al. | EP | 0 696 001 | 12/2001 |
| 2003/0014743 | A1 | 1/2003 | Cooke et al. | EP | 1 669 885 | 6/2006 |
| 2003/0046607 | A1 | 3/2003 | Vorbach | FR | 2 752 466 | 2/1998 |
| 2003/0052711 | A1 | 3/2003 | Taylor et al. | GB | 2 304 438 | 3/1997 |
| 2003/0055861 | A1 | 3/2003 | Lai et al. | JP | 58-58672 | 4/1983 |
| 2003/0056062 | A1 | 3/2003 | Prabhu | JP | 10-44571 | 2/1989 |
| 2003/0056085 | A1 | 3/2003 | Vorbach | JP | 01-229378 | 9/1989 |
| 2003/0056091 | A1 | 3/2003 | Greenberg | JP | 2-130023 | 5/1990 |
| 2003/0056202 | A1 | 3/2003 | Vorbach | JP | 2-226423 | 9/1990 |
| 2003/0061542 | A1 | 3/2003 | Bates et al. | JP | 5-276007 | 10/1993 |
| 2003/0062922 | A1 | 4/2003 | Douglass et al. | JP | 6-266605 | 9/1994 |
| 2003/0070059 | A1 | 4/2003 | Dally et al. | JP | 07-086921 | 3/1995 |
| 2003/0086300 | A1 | 5/2003 | Noyes et al. | JP | 7-154242 | 6/1995 |
| 2003/0093662 | A1 | 5/2003 | Vorbach et al. | JP | 8-148989 | 6/1995 |
| 2003/0097513 | A1 | 5/2003 | Vorbach et al. | JP | 7-182160 | 7/1995 |
| 2003/0123579 | A1 | 7/2003 | Safavi et al. | JP | 7-182167 | 7/1995 |
| 2003/0135686 | A1 | 7/2003 | Vorbach et al. | JP | 8-44581 | 2/1996 |
| 2003/0154349 | A1 | 8/2003 | Berg et al. | JP | 08069447 | 3/1996 |
| 2003/0192032 | A1 | 10/2003 | Andrade et al. | JP | 08-101761 | 4/1996 |
| 2004/0015899 | A1 | 1/2004 | May et al. | JP | 8-102492 | 4/1996 |
| 2004/0025005 | A1 | 2/2004 | Vorbach et al. | JP | 8-106443 | 4/1996 |
| 2004/0039880 | A1 | 2/2004 | Pentkovski et al. | JP | 8-221164 | 8/1996 |
| 2004/0168099 | A1 | 8/2004 | Vorbach et al. | JP | 8-250685 | 9/1996 |
| 2004/0199688 | A1 | 10/2004 | Vorbach et al. | JP | 9-27745 | 1/1997 |
| 2005/0066213 | A1 | 3/2005 | Vorbach et al. | JP | 9-237284 | 9/1997 |
| 2005/0091468 | A1 | 4/2005 | Morita et al. | JP | 09-294069 | 11/1997 |
| 2005/0144210 | A1 | 6/2005 | Simkins et al. | JP | 11-046187 | 2/1999 |
| 2005/0144212 | A1 | 6/2005 | Simkins et al. | JP | 11-307725 | 11/1999 |
| 2005/0144215 | A1 | 6/2005 | Simkins et al. | JP | 2000-076066 | 3/2000 |
| 2006/0036988 | A1 | 2/2006 | Allen et al. | JP | 2000-181566 | 6/2000 |
| 2006/0230094 | A1 | 10/2006 | Simkins et al. | JP | 2000-21066 | 7/2000 |
| 2006/0230096 | A1 | 10/2006 | Thendean et al. | JP | 2000-311156 | 11/2000 |
| 2007/0083730 | A1 | 4/2007 | Vorbach et al. | JP | 2001-500682 | 1/2001 |
| 2008/0313383 | A1 | 12/2008 | Morita et al. | JP | 2001-510650 | 7/2001 |
| 2009/0193384 | A1 | 7/2009 | Sima et al. | JP | 2001-236221 | 8/2001 |
| 2010/0306602 | A1 | 12/2010 | Kamiya et al. | JP | 2002-0033457 | 1/2002 |
| | | | | JP | 05-509184 | 12/2003 |
| | | FOREIGN PATENT DOCUMENTS | | JP | 3-961028 | 8/2007 |
| DE | | 44 16 881 | 11/1994 | WO | WO90/04835 | 5/1990 |
| DE | | 38 55 673 | 11/1996 | WO | WO90/11648 | 10/1990 |
| DE | | 196 51 075 | 6/1998 | WO | WO92/01987 | 2/1992 |
| DE | | 196 54 593 | 7/1998 | WO | WO93/11503 | 6/1993 |
| DE | | 196 54 595 | 7/1998 | WO | WO94/06077 | 3/1994 |

| | | |
|---|---|---|
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO 9835294 A2 * | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO2004/053718 | 6/2004 |
| WO | WO2004/114128 | 12/2004 |
| WO | WO2005/045692 | 5/2005 |
| WO | WO 2007/030395 | 3/2007 |

OTHER PUBLICATIONS

Albahama, O.T. et al., "On the Viability of FPGA-Based Integrated Coprocessors," Dept. of Electrical and Electronic Engineering, Imperial College of Science, London, 1999 IEEE, pp. 206-215.
Altera, "Flex 8000 Programmable Logic Device Family," Altera Corporation product description, Jan. 2003, pp. 1-62.
Altera, "Flex 10K Embedded Programmable Logic Device Family," Altera Corporation product description, Jan. 2003, pp. 1-128.
Athanas et al., "Processor Reconfiguration Through Instruction-Set Metamorphosis," 1993, IEEE Computers, pp. 11-18.
Atmel, 5-K-50K Gates Coprocessor FPGA with Free Ram, Data Sheet, Jul. 2006, 55 pages.
Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Bacon, D. et al., "Compiler Transformations for High-Performance Computing," ACM Computing Surveys, 26(4):325-420 (1994).
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).
Becker, J., "Configurable Systems-on-Chip (CSoC),"(Invited Tutorial), Proc. of 9th Proc. of XV Brazilian Symposium on Integrated Circuit, Design (SBCCI 2002), (Sep. 2002).

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cardoso, J.M.P. et al., "A novel algorithm combining temporal partitioning and sharing of functional units," University of Algarve, Faro, Portugal, 2001 IEEE, pp. 1-10.
Compton, K. et al., "Configurable Computing: A Survey of Systems and Software," Northwestern University, Dept. of ECE, Technical Report, 1999, (XP-002315148), 39 pages.
Clearspeed, CSX Processor Architecture, Whitepaper, PN-1110-0702, 2007, pp. 1-15, www.clearspeed.com.
Clearspeed, CSX Processor Architecture, Whitepaper, PN-1110-0306, 2006, pp. 1-14, www.clearspeed.com.
Cronquist, D. et al., Architecture Design of Reconfigurable Pipelined Datapaths, Department of Computer Science and Engineering, University of Washington, Seattle, WA, Proceedings of the $20^{th}$ Anniversary Conference on Advanced Research in VSLI, 1999, pp. 1-15.
DeHon, Andre, "Reconfigurable Architectures for General-Purpose Computing," Massachusetts Institute of Technology, Technical Report AITR-1586, Oct. 1996, XP002445054, Cambridge, MA, pp. 1-353.
Diniz, P., et al., "A behavioral synthesis estimation interface for configurable computing," University of Southern California, Marina Del Rey, CA, 2001 IEEE, pp. 1-2.
Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.
Equator, Pixels to Packets, Enabling Multi-Format High Definition Video, Equator Technologies BSP-15 Product Brief, www.equator.com, 2001, 4 pages.
Freescale Slide Presentation, An Introduction to Motorola's RCF (Reconfigurable Compute Fabric) Technology, Presented by Frank David, Launched by Freescale Semiconductor, Inc., 2004, 39 pages.
Genius, D. et al., "A Case for Array Merging in Memory Hierarchies," Proceedings of the 9th International Workshop on Compilers for Parallel Computers, CPC'01 (Jun. 2001), 10 pages.
Hartenstein, R. et al., "A new FPGA architecture for word-oriented datapaths," Proc. FPL'94, Springer LNCS, Sep. 1994, pp. 144-155.
Hwang, K., "Advanced Computer Architecture—Parallelism, Scalability, Programmability," 1993, McGraw-Hill, Inc., pp. 348-355.
Hwang, K., "Computer Architecture and Parallel Processing," Data Flow Computers and VLSI Computations, XP-002418655, 1985 McGraw-Hill, Chapter 10, pp. 732-807.
IBM Technical Disclosure Bulletin, IBM Corp., New York, XP000424878, Bd. 36, Nr. 11, Nov. 1, 1993, pp. 335-336.
Inside DSP, "Ambric Discloses Massively Parallel Architecture," Aug. 23, 2006, HTTP://insidedsp.com/tabid/64/articleType/ArticleView/articleId/155/Defa..., 2 pages.
Intel, Intel MXP5800/MXP5400 Digital Media Processors, Architecture Overview, Jun. 2004, Revision 2.4, pp. 1-24.
Kaul, M., et al., "An automated temporal partitioning and loop fission approach of FPGA based reconfigurable synthesis of DSP applications," University of Cincinnati, Cincinnati, OH, ACM 1999, pp. 616-622.
Kean, T.A., "Configurable Logic: A Dynamically Programmable Cellular Architecture and its VLSI Implementation," University of Edinburgh (Dissertation) 1988, pp. 1-286.
Kean, T., et al., "A Fast Constant Coefficient Multiplier for the XC6200," Xilinx, Inc., Lecture Notes in Computer Science, vol. 1142, Proceedings of the $6^{th}$ International Workshop of Field-Programmable Logic, 1996, 7 pages.
Kim et al., "A Reconfigurable Multifunction Computing Cache Architecture," IEEE Transactions on Very Large Scale Integration (VLSI) Systems vol. 9, Issue 4, Aug. 2001 pp. 509-523.
Knittel, Gunter, "A PCI-compatible FPGA-Coprocessor for 2D/3D Image Processing," University of Turgingen, Germany, 1996 IEEE, pp. 136-145.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Margolus, N., "An FPGA architecture for DRAM-based systolic computations," Boston University Center for Computational Science and MIT Artificial Intelligence Laboratory, IEEE 1997, pp. 2-11.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Olukotun, K., "The Case for a Single-Chip Microprocessor," ACM Sigplan Notices, ACM, Association for Computing Machinery, New York, vol. 31, No. 9, Sep. 1996 pp. 2-11.

PACT Corporation, "The XPP Communication System," Technical Report 15 (2000), pp. 1-16.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Parhami, B., "Parallel Counters for Signed Binary Signals," Signals, Systems and Computers, 1989, Twenty-Third Asilomar Conference, vol. 1, pp. 513-516.

Saleeba, Z.M.G., "A Self-Reconfiguring Computer System," Department of Computer Science, Monash University (Dissertation) 1998, pp. 1-306.

Schmidt, H. et al., "Behavioral synthesis for FGPA-based computing," Carnegie Mellon University, Pittsburgh, PA, 1994 IEEE, pp. 125-132.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Soni, M., "VLSI Implementation of a Wormhole Run-time Reconfigurable Processor," Jun. 2001, (Masters Thesis)Virginia Polytechnic Institute and State University, 88 pages.

Sutton et al., "A Multiprocessor DSP System Using PADDI-2," U.C. Berkeley, 1998 ACM, pp. 62-65.

Tsutsui, A., et al., "YARDS: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21.

Waingold, E., et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing" (Addison-Wesley 1996) Table of Contents, 11 pages.

Xilinx, "Spartan and SpartanXL Families Field Programmable Gate Arrays," Jan. 1999, Xilinx, pp. 4-3 through 4-70.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley (2004), pp. 1-120.

Zima, H. et al., "Supercompilers for parallel and vector computers" (Addison-Wesley 1991) Table of Contents, 5 pages.

ARM Limited, "ARM Architecture Reference Manual," Dec. 6, 2000, pp. A10-6-A10-7.

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38th conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," Xilinx, Inc., Section 2, pp. 1-240, Section 8, pp. 1, 23-25, 29, 45-52, 169-172 (1994).

U.S. Appl. No. 60/109,417, filed Nov. 18, 1998, Jefferson et al.

Becker et al., "Automatic Parallelism Exploitation for FPL-Based Accelerators," 1998, Proc. 31st Annual Hawaii International Conference on System Sciences, pp. 169-178.

Cardoso, J.M.P. et al., "Compilation and Temporal Partitioning for a Coarse-Grain Reconfigurable Architecture," New Algorithms, Architectures and Applications for Reconfigurable Computing, Lysacht, P. & Rosentiel, W. eds., (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99, Proceedings, Seventh Annual IEEE Symposium on NAPA Valley, CA, USA, Apr. 21-23, 1999, IEEE Comput. Soc, US, (Apr. 21, 1999) pp. 2-11.

Cook, Jeffrey J., "The Amalgam Compiler Infrastructure," Thesis at the University of Illinois at Urbana-Champaign (2004) Chapter 7 & Appendix G.

Fawcett, B.K., "Map, Place and Route: The Key to High-Density PLD Implementation," Wescon Conference, IEEE Center (Nov. 7, 1995) pp. 292-297.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Koch, Andreas et al., "High-Level-Language Compilation for Reconfigurable Computers," Proceedings of European Workshop on Reconfigurable Communication-Centric SOCS (Jun. 2005) 8 pages.

Moraes, F., et al., "A Physical Synthesis Design Flow Based on Virtual Components," XV Conference on Design of Circuits and Integrated Systems (Nov. 2000) 6 pages.

Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.

Schonfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Sondervan, J., "Retiming and logic synthesis," Electronic Engineering (Jan. 1993) vol. 65(793), pp. 33, 35-36.

Agaiwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alike, Peter; New, Bernie, *Xilinx Application Note*, "Additional XC3000 Data," XAPP 024.000, 1994, pp. 8-11 through 8-20.

Alike, Peter; New, Bernie, *Xilinx Application Note*, "Adders, Subtracters and Accumulators in XC3000," XAPP 022.000, 1994, pp. 8-98 through 8-104.

Alike, Peter, *Xilinx Application Note*, "Megabit FIFO in Two Chips: One LCA Device and One DRAM," XAPP 030.000, 1994, pp. 8-148 through 8-150.

Alike, Peter, *Xilinx Application Note*, "Dynamic Reconfiguration," XAPP 093, Nov. 10, 1997, pp. 13-45 through 13-46.

Alike, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL41096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., *Buyer's Guide to DSP Processors*, 1995, Fremont, CA., pp. 673-698.

Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.

Camilleri, Nick; Lockhard, Chris, *Xilinx Application Note*, "Improving XC4000 Design Performance," XAPP 043.000, 1994, pp. 8-21 through 8-35.

Cartier, Lois, *Xilinx Application Note*, "System Design with New XC4000EX I/O Features," Feb. 21, 1996, pp. 1-8.

Chen, D., (Thesis) "Programmable arithmetic devices for high speed digital signal processing," U. California Berkeley 1992, pp. 1-175.

Churcher, S., et al., "The XC6200 FastMap TM Processor Interface," Xilinx, Inc., Aug. 1995, pp. 1-8.

Cowie, Beth, *Xilinx Application Note*, "High Performance, Low Arca, Interpolator Design for the XC6200," XAPP 081, May 7, 1997 (Version 1.0), pp. 1-10.

Duncan, Ann, *Xilinx Application Note*, "A32x16 Reconfigurable Correlator for the XC6200," XAPP 084, Jul. 25, 1997 (Version 1.0), pp. 1-14.

Ebeling, C., et al., "RaPiD—Reconfigurable Pipelined Datapath," Dept. of Computer Science and Engineering, U. Washington, 1996, pp. 126-135.

Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.

Fawcett, B., "New SRAM-Based FPGA Architectures Address New Applications," Xilinx, Inc. San Jose, CA, Nov. 1995, pp. 231-236.

Goslin, G; Newgard, B, *Xilinx Application Note*, "16-Tap, 8-Bit FIR Filter Applications Guide," Nov. 21, 1994, pp. 1-5.

Iwanczuk, Roman, *Xilinx Application Note*, "Using the XC4000 RAM Capability," XAPP 031.000, 1994, pg. 8-127 through 8-138.

Knapp, Steven, "Using Programmable Logic to Accelerate DSP Functions," Xilinx, Inc., 1995, pp. 1-8.

New, Bernie, *Xilinx Application Note*, "Accelerating Loadable Counters in SC4000," XAPP 023.001, 1994, pp. 8-82 through 8-85.

New, Bernie, *Xilinx Application Note*, "Boundary Scan Emulator for XC3000," XAPP 007.001, 1994, pp. 8-53 through 8-59.

New, Bernie, *Xilinx Application Note*, "Ultra-Fast Synchronous Counters," XAPP 014.001, 1994, pp. 8-78 through 8-81.

New, Bernie, *Xilinx Application Note*, "Using the Dedicated Carry Logic in XC4000," XAPP 013.001, 1994, pp. 8-105 through 8-115.

New, Bernie, *Xilinx Application Note*, "Complex Digital Waveform Generator," XAPP 008.002, 1994, pp. 8-163 through 8-164.

New, Bernie, *Xilinx Application Note*, "Bus-Structured Serial Input-Output Device," XAPP 010.001, 1994, pp. 8-181 through 8-182.

Ridgeway, David, *Xilinx Application Note*, "Designing Complex 2-Dimensional Convolution Filters," XAPP 037.000, 1994, pp. 8-175 through 8-177.

Rowson, J., et al., "Second-generation compilers optimize semicustom circuits," Electronic Design, Feb. 19, 1987, pp. 92-96.

Schewel, J., "A Hardware/Software Co-Design System using Configurable Computing Technology," Virtual Computer Corporation, Reseda, CA, IEEE 1998, pp. 620-625.

Segers, Dennis, Xilinx Memorandum, "MIKE—Product Description and MRD," Jun. 8, 1994, pp. 1-29.

Texas Instruments, "TMS320C8x System-Level Synopsis," Sep. 1995, 75 pages.

Texas Instruments, "TMS320C80 Digital Signal Processor," Data Sheet, Digital Signal Processing Solutions 1997, 171 pages.

Texas Instruments, "TMS320C80 (MVP) Parallel Processor," User's Guide, Digital Signal Processing Products 1995, 73 pages.

Trainor, D.W., et al., "Implementation of the 2D DCT Using a Xilinx XC6264 FPGA," 1997, IEEE Workshop of Signal Processing Systems SiPS 97, pp. 541-550.

Trimberger, S, (Ed.) et al., "Field-Programmable Gate Array Technology," 1994, Kluwer Academic Press, pp. 1-258 (and the Title Page, Table of Contents, and Preface) [274 pages total].

Trimberger, S., "A Reprogrammable Gate Array and Applications," IEEE 1993, Proceedings of the IEEE, vol. 81, No. 7, Jul. 1993, pp. 1030-1041.

Trimberger, S., et al., "A Time-Multiplexed FPGA," Xilinx, Inc., 1997 IEEE, pp. 22-28.

Ujvari, Dan, *Xilinx Application Note*, "Digital Mixer in an XC7272," XAPP 035.002, 1994, p. 1.

Veendrick, H., et al., "A 1.5 GIPS video signal processor (VSP)," Philips Research Laboratories, The Netherlands, IEEE 1994 Custom Integrated Circuits Conference, pp. 95-98.

Wilkie, Bill, *Xilinx Application Note*, "Interfacing XC6200 to Microprocessors (TMS320C50 Example)," XAPP 064, Oct. 9, 1996.(Version 1.1), pp. 1-9.

Wilkie, Bill, *Xilinx Application Note*, "Interfacing XC6200 to Microprocessors (MC68020 Example)," XAPP 063, Oct. 9, 1996 (Version 1.1), pp. 1-8.

XCELL, Issue 18, Third Quarter 1995, "Introducing three new FPGA Familiesl"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1 .0), pp. 4-253-4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al,, "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "ZS9120 289920 (ROMless) 16-Bit Mixed Signal Processor," 1992, pp. 1-82.
Defendants' Invalidity Contentions in *PACT XPP Technologies, AG v. Xilinx, Inc., et al.*, (E.D. Texas Dec. 28, 2007) (No. 2:07cv563)., including Exhibits A through K in separate PDF files.
Becker, J., "A Partitioning Compiler for Computers with Xputer-based Accelerators," 1997, Kaiserslautern University, 326 pp.
Hartenstein et al., "Parallelizing Compilation for a Novel Data-Parallel Architecture," 1995, PCAT-94, Parallel Computing: Technology and Practice, 13 pp.
Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.
Huang, Libo et al., "A New Architecture for Multiple-Precision Floating-Point Multiply-Add Fused Unit Design," School of Computer National University of Defense Technology, China, IEEE 2007, 8 pages.
Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.
Xilinx, White Paper 370: (Virtex-6 and Spartan-6 FPGA Families) "Reducing Switching Power with Intelligent Clock Gating," Frederic Rivoallon, May 3, 2010, pp. 1-5.
Xilinx, White Paper 298: (Spartan-6 and Virtex-6 Devices) "Power Consumption at 40 and 50 nm," Matt Klein, Apr. 13, 2009, pp. 1-21.
Altera, "2. TriMatrix Embedded Memory Blocks in Stratix & Stratix GX Devices," Altera Corporation, Jul. 2005, 28 pages.
Altera, "Apex II Programmable Logic Device Family," Altera Corporation Data Sheet, Aug. 2002, Ver. 3.0, 99 pages.
"BlueGene/L—Hardware Architecture Overview," BlueGene/L design team, IBM Research, Oct. 17, 2003 slide presentation, pp. 1-23.
"BlueGene/L: the next generation of scalable supercomputer," Kissel et al., Lawrence Livermore National Laboratory, Livermore, California, Nov. 18, 2002, 29 pages.
BlueGene Project Update, Jan. 2002, IBM slide presentation, 20 pages.
BlueGene/L, "An Overview of the BlueGene/L Supercomputer," The BlueGene/L Team, IBM and Lawrence Livermore National Laboratory, 2002 IEEE. pp. 1-22.
Epstein, Dave, "IBM Extends DSP Performance with Mfaxt," Microprocessor Report, vol. 9, No. 16 (MicroDesign Resources), Dec. 4, 1995, pp. 1-4 [XL0029013].
Galanis, M.D. at al., "Accelerating Applications by Mapping Critical Kernels on Coarse-Grain Reconfigurable Hardware in Hybrid Systems," Proceedings of the 13th Annual IEEE Symposium on Field-Programmable Custom Computing Machines, 2005, 2 pages.

Guo, Z. et al., "A Compiler Intermediate Representation for Reconfigurable Fabrics," University of California, Riverside, Dept. of Electrical Engineering, IEEE 2006, 4 pages.
Gwennap, Linley, "P6 Underscores Intel's Lead," Microprocessor Report, vol. 9., No. 2, Feb. 16, 1995 (MicroDesign Resources), p. 1 and pp. 6-15.
Gwennap, Linley, "Intel's P6 Bus Designed for Multiprocessing," Microprocessor Report, vol. 9, No. 7 (MicroDesign Resources), May 30, 1995, p. 1 and pp. 6-10.
Intel, "Pentium Pro Family Developer's Manual , vol. 3 Operating System Writer's Guide," Intel Corporation, Dec. 1995, [submitted in 4 PDF files: Part I, Part II, Part III and Part IV], 458 pages.
U.S. Appl. No. 90/010,979, filed May 4, 2010, Vorbach et al.
U.S. Appl. No. 90/011,087, filed Jul. 8, 2010, Vorbach et al.
Hauser, John Reid, (Dissertation) "Augmenting a Microprocessor with Reconfigurable Hardware," University of California, Berkeley, Fall 2000, 255 pages (submitted in 3 PDFs, Parts 1-3).
Hauser, John R., "The Garp Architecture,"University of California at Berkeley, Computer Science Division, Oct. 1997, pp. 1-55.
Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.
Xilinx, Inc.'s and Avnet, Inc.'s Disclosure Pursuant to P.R. 4-2; *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, 4 pages.
Xilinx, Inc.'s and Avnet, Inc.'s Disclosure Pursuant to P.R. 4-1;*PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, 9 pages.
Defendant's Claim Construction Chart for P.R. 4-2 Constructions and Extrinsic Evidence for Terms Proposed by Defendants, *PACT XPP Technologies, AG. V. Xilinx, Inc. and Avnet, Inc.*, Case No. 2:07-ev-00563-TJW-CE, U.S. District Court for the Eastern District of Texas, Dec. 28, 2007, pp. 1-19.
PACT's P.R. 4-1 List of Claim Terms for Construction, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-7.
PACT's P.R. 4-2 Preliminary Claim Constructions and Extrinsic Evidence, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).
Arabi et al., "PLD Integrates Dedicated High-speed Data Buffering, Complex State Machine, and Fast Decode Array," conference record on WESCON '93, Sep. 28, 1993, pp. 432-436.
Ade et al., "Minimum Memory Buffers in DSP Applications," Electronics Letters, vol. 30, No. 6, Mar. 17, 1994, pp. 469-471.
Villasenor, John et al., "Configurable Computing," *Scientific American*, vol. 276, No. 6, Jun. 1997, pp. 66-71.
Villasenor, John et al., "Configurable Computing Solutions for Automatic Target Recognition " *IEEE*, 1996 pp. 70-79.
Tau, Edward et al., "A First Generation DPGA Implementation," *FPD'95*, pp. 138-143.
Athanas, Peter et al., "IEEE Symposium on FPGAs for Custom Computing Machines," *IEEE Computer Society Press*, Apr. 19-21, 1995, pp. i-vii, 1-222.
Athanas, Peter et al., "An Adaptive Hardware Machine Architecture and Compiler for Dynamic Sensor Reconfiguration", IEEE, Laboratory for Engineering Man/Machine System Division of Engineering, Box D, Brown University Providence, Rhode Island, 1991, pp. 397-400.
Bittner, Ray A. Jr., "Wormhole Run-time Reconfiguration: Conceptualization and VLSI Design of a High Performance Computing System," *Dissertation*, Jan. 23, 1997, pp. I-XX, 1-415.
Myers, G. "Advances in Computer Architecture," Wiley-Interscience Publication, 2nd ed., John Wiley & Sons, Inc. pp. 463-494, 1978.
M. Saleeba, "A Self-Contained Dynamically Reconfigurable Processor Architecture," Sixteenth Australian Computer Science Conference, ASCS-16, QLD, Australia, Feb. 1993.

M. Morris Mano, "Digital Design," by Prentice Hall, Inc., Englewood Cliffs, New Jersey 07632, 1984, pp. 119-125, 154-161.
Maxfield, C. "Logic that Mutates While-U-Wait" EDN (Bur. Ed) (USA), EDN (European Edition), Nov. 7, 1996, Cahners Publishing, USA.
Norman, Richard S., "Hyperchip Business Summary, The Opportunity," Jan. 31, 2000, pp. 1-3.
Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
Baumgarte, V., et al., PACT XPP "A Self-reconfigurable Data Processing Architecture," PACT Info. GMBH, Munchen Germany 2001.
Jantsch, Axel et al., "A Case Study on Hardware/software Partitioning," Royal Institute of Technology, Kista, Sweden, Apr. 10, 1994 IEEE, pp. 111-118.
Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.
Isshiki, Tsuyoshi et al., "Bit-Serial Pipeline Synthesis for Multi-FPGA Systems with C++ Design Capture," 1996 IEEE, pp. 38-47.
Weinhardt, Markus, "Ubersetzingsmethoden fur strukturprogrammierbare rechner," Dissertation for Doktors der Ingenieurwissenschaften der Universitat Karlsruhe: Jul. 1, 1997.
Hammes, Jeff et al., "Cameron: High Level Language Compilation for Reconfigurable Systems," Department of Computer Science, Colorado State University, Conference on Parallel Architectures and Compilation Techniques, Oct. 12-16, 1999.
K. Wada et al., "A Performance Evaluation of Tree-based Coherent Distributed Shared Memory" Proceedings of the Pacific RIM Conference on Communications, Comput and Signal Processing, Victoria, May 19-21, 1993.
Nilsson et al., "The Scalable Tree Protocol—A Cache Coherence Approaches for Large-Scale Multiprocessors" IEEE, pp. 498-506 Dec. 1992.
Wu et al., "A New Cache Directory Scheme", IEEE, pp. 466-472, Jun. 1996.
Hauck "The Roles of FPGA's in Reprogrammable Systems," IEEE, Apr. 1998, pp. 615-638.
Wittig et al., "OneChip: An FPGA Processor with Reconfigurable Logic" IEEE, 1996 pp. 126-135.
Cadambi et al., "Managing Pipeline-reconfigurable FPGAs," ACM, 1998, pp. 55-64.
Hong Yu Xu et al., "Parallel QR Factorization on a Block Data Flow Architecture" Conference Proceeding Article, Mar. 1, 1992, pp. 332-336 XP010255276, p. 333, Abstract 2.2, 2.3, 2.4-p. 334.
Mirsky, E. DeHon, "Matrix: A Reconfigurable Computing Architecture with Configurable Instruction Distribution and Deployable Resources," Proceedings of the IEEE Symposium on FPGAs for Custom Computing Machines, 1996, pp. 157-1666.
Weinhardt, M. "Compilation Methods for Structure-programmable Computers", dissertation, ISBN 3-89722-011-3, 1997.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).
Kung, "Deadlock Avoidance for Systolic Communication", 1988 Conference Proceedings of 15th Annual International Symposium on Computer Architecture, May 30, 1988, pp. 252-260.
TMS320C54X DSP: CPU and Peripherals, Texas Instruments, 1996, pp. 6-26 to 6-46.
TMS320C54x DSP: Mnemonic Instruction Set, Texas Instruments, 1996, p. 4-64.
Xlinx, "Logic Cell Array Families: XC4000, XC4000A and XC4000H", product description, pp. 2-7 to 2-15, Additional XC3000, XC31000 and XC3100A Data, pp. 8-16 and 9-14.
Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.
Forstner, Peter "Wer Zuerst Kommt, Mahlt Zuerst!: Teil 3: Einsatzgebiete and Anwendungsbeispiele von FIFO-Speichern", Elektronik, Aug. 2000, pp. 104-109.
John R. Hauser et al., "Garp: A MIPS Processor with a Reconfigurable Coprocessor", University of California, Berkeley, IEEE, 1997, pp. 12-21.
Jorg Donandt, "Improving Response Time of Programmable Logic Controllers by Use of a Boolean processor", AEG Research Institute Berlin, IEEE, 1989, pp. 4-167-4-1.
Alexandre F. Tenca et al., "A Variable Long-Precision Arithmetic Unit Design for Reconfigurable Coprocessor Architectures", University of California, Los Angeles, 1998, pp. 216-225.
Andreas Koch et al, "Practical Experiences with the SPARXIL Co-Processor", 1998, IEEE, pp. 394-398.
Gokhale M. B. et al., "Automatic Allocation of Arrays to Memories in FPGA processors with Multiple Memory Banks", Field-Programmable Custom Computing Machines, 1999, IEEE, pp. 63-67.
Christian Siemers, "Rechenfabrik Ansaetze Fuer Extrem Parallele Prozessoren", Verlag Heinze Heise GmbH., Hannover, DE No. 15, Jul. 16, 2001, pp. 170-179.
Pedro Diniz et al., "Automatic Synthesis of Data Storage and Control Structures for FPGA-based Computing Engines", 2000, IEEE, pp. 91-100.
Markus Weinhardt et al., "Pipeline Vectorization for Reconfigurable Systems", 1999, IEEE, pp. 52-60.
Lizy John et al., "A Dynamically Reconfigurable Interconnect for Array Processors", vol. 6, No. 1, Mar. 1998, IEEE, pp. 150-157.
Ballagh et al., "Java Debug Hardware Models Using JBits," 8th Reconfigurable Architectures Workshop, 2001, 8 pages.
Bellows et al., "Designing Run-Time Reconfigurable Systems with JHDL," Journal of VLSI Signal Processing, vol. 28, Kluwer Academic Publishers, The Netherlands, 2001, pp. 29-45.
Guccione et al., "JBits: Java based interface for reconfigurable computing," Xilinx, Inc., San Jose, CA, 1999, 9 pages.
Price et al., "Debug ofReconfigurable Systems," Xilinx, Inc., San Jose, CA, Proceedings of SPIE, 2000, pp. 181-187.
Sundararajan et al., "Testing FPGA Devices Using JBits," Proc. MAPLD 2001, Maryland, USA, Katz (ed.), NASA, CA, 8 pages.
U.S. Appl. No. 90/010,450, filed Mar. 27, 2009.
Culler, D.E; Singh, J.P., "Parallel Computer Architecture," p. 17, 1999, Morgan Kaufmann, San Francisco, CA USA, XP002477559.
Short, Kenneth L., *Microprocessors and Programmed Logic*, Prentice Hall, Inc., New Jersey 1981, p. 34.
Webster's Ninth New Collegiate Dictionary, Merriam-Webster, Inc., 1990, p. 332 (definition of "dedicated").
Abnous, A., et al., "The Pleiades Architecture," Chapter I of *The Application of Programmable DSPs in Mobile Communications*, A. Gatherer and A. Auslander, Ed., Wiley, 2002, pp. 1-33.
Alippi, et al., "Determining the Optimum Extended Instruction Set Architecture for Application Specific Reconfigurable VLIW CPUs," IEEE, 2001, pp. 50-56.
Athanas, "A Functional Reconfigurable Architecture and Compiler for Adoptive Computing," IEEE 1993, pp. 49-55.
Beck et al., "From control flow to data flow," TR 89-1050, Oct. 1989, Dept. of Computer Science, Cornell University, Ithaca, NY, pp. 1-25.
Callahan, et al., "The Garp Architecture and C Compiler," Computer, Apr. 2000, pp. 62-69.
Cardoso, Joao M.P. And Markus Weinhardt, "XPP-VC: a C Compiler with Temporal Partitioning for the PACT-XPP Architecture," Field-Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.
Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.
DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Dutt, et al., "If Software is King for Systems-in-Silicon, What's New in Compiler?," IEEE, 1997, pp. 322-325.
Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.
Fornaciari, et al., System-level power evaluation metrics, 1997 Proceedings of the $2^{nd}$ Annual IEEE International Conference on Innovative Systems in Silicon, New York, NY, Oct. 1997, pp. 323-330.
Franklin, Manoj et al., "A Fill-Unit Approach to Multiple Instruction Issue," Proceedings of the Annual International Symposium on Microarchitecture, Nov. 1994, pp. 162-171.
Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.
Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).
Hedge, S.J., "3D WASP Devices for On-line Signal and Data Processing," 1994, International Conference on Wafer Scale Integration, pp. 11-21.
Iseli, C.,et al. "A C++ Compiler for FPGA Custom Execution Units Synthesis," IEEE, 1995, pp. 173-179.
Jacob, J., et al., "Memory Interfacing and Instruction Specification for Reconfigurable Processors," ACM 1999, pp. 145-154.
Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.
Koren et al., "A data-driven VLSI array for arbitrary algorithms," IEEE Computer Society, Long Beach, CA vol. 21, No. 10, Oct. 1, 1988, pp. 30-34.
Lee, Jong-eun et al., "Reconfigurable ALU Array Architecture with Conditional Execution," International Soc. Design Conference (ISOOC) [online] Oct. 25, 2004, Seoul, Korea, 5 pages.
Ling, X., "WASMII: An MPLD with Data-Driven Control on a Virtual Hardware," Journal of Supercomputing, Kluwer Acdemic Publishers, Dordrecht, Netherlands, 1995, pp. 253-276.
Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.
Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.
Piotrowski, A., "IEC-BUS, Die Funktionsweise des IEC-Bus unde seine Anwendung in Geräten and Systemen," 1987, Franzis-Verlag GmbH, Munchen, pp. 20-25.
Razdan et al., A High-Performance Microarchitecture with Hardware-Programmable Functional Units, Micro-27, Proceedings of the $27^{th}$ Annual International Symposium on Microarchitecture, IEEE Computer Society and Association for Computing Machinery, Nov. 30-Dec. 2, 1994, pp. 172-180.
Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.
Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.
Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the $3^{rd}$ Australian Computer Architecture Conference, Perth, John Morris, Ed., Feb. 2-3, 1998, pp. 169-178.
Simunic, et al., Source Code Optimization and Profiling of Energy Consumption in Embedded Systems, Proceedings of the $13^{th}$ International Symposium on System Synthesis, Sep. 2000, pp. 193-198.
Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].
The XPP White Paper, Release 2.1, PACT—A Technical Perspective, Mar. 27, 2002, pp. 1-27.
Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.
Weinhardt, M., "Compilation Methods for Structure-programmable Computers," dissertation, ISBN 3-89722-011-3, 1997. [Table of Contents and English Abstract Provided].
Weinhardt, Markus et al., "Pipeline Vectorization," IEEE Transactions on Computer-Aided Design of Integrated Circuits and Systems, vol. 20, No. 2, Feb. 2001, pp. 234-248.
Xilinx, "Logic Cell Array Families: XC4000, XC4000A and XC4000H," product description, pp. 2-7, 2-9, 2-14, 2-15, 8-16, and 9-14.
Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.
Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop*, IEEE Press, pp. 225-234, Napa, Oct. 1992.
Yeung, A. et al., "A reconfigurable data-driven multiprocessor architecture for rapid prototyping of high throughput DSP algorithms," Dept of Electrical Engineering and Computer Sciences, Univ. of California, Berkeley, USA, pp. 169-178, *IEEE* 1993.
Zhang, et al., Architectural Evaluation of Flexible Digital Signal Processing for Wireless Receivers, Signals, Systems and Computers, 2000; Conference Record of the Thirty-Fourth Asilomar Conference, Bd. 1, Oct. 29, 2000, pp. 78-83.
Altera, "Implementing High-Speed Search Applications with Altera CAM," Jul. 2001, Ver. 2.1, Application Note 119, 50 pages.
Bolsens, Ivo (CTO Xilinx), "FPGA, a history of interconnect," Xilinx slide presentation, posted on the internet Oct. 30, 2008 at http://www.docstoc.com/docs/2198008/FPGA-a-history-of-interconnect, 32 pages.
Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.
Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.
Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.
Li et al., "Hardware-Software Co-Design of Embedded Reconfigurable Architectures," Los Angeles, CA, 2000, ACM, pp. 507-512.
Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.
Melvin, Stephen et al., "Hardware Support for Large Atomic Units in Dynamically Scheduled Machines," Computer Science Division, University of California, Berkeley, IEEE (1988), pp. 60-63.
Pistorius et al., "Generation of Very Large Circuits to Benchmark the Partitioning of FPGAs," Monterey, CA, 1999, ACM, pp. 67-73.
Roterberg, Eric., et al., "Trace Cache: a Low Latency Approach to High Bandwidth Instruction Fetching," Proceedings of the $29^{th}$ Annual International Symposium on Michoarchitecture, Paris, France, IEEE (1996), 12 pages.

Translation of DE 101 39 170 by examiner using Google Translate, 10 pages.
Microsoft Press Computer Dictionary, Third Edition, Redmond, WA, 1997, 3 pages.
Microsoft Press Computer Dictionary, Second Edition, Redmond, WA, 1994, 3 pages.
A Dictionary of Computing, Fourth Edition, Oxford University Press, 1997, 4 pages.
Communications Standard Dictionary, Third Edition, Martin Weik (Ed.), Chapman & Hall, 1996, 3 pages.
Dictionary of Communications Technology, Terms Definitions and Abbreviations, Second Edition, Gilbert Held (Ed.), John Wiley & Sons, England, 1995, 5 pages.
The Random House College Dictionary, Revised Edition, Random House, Inc., 1984, 14 pages.
The Random House College Dictionary, Revised Edition, Random House, Inc., 1984, 7 pages.
Random House Webster's College Dictionary with CD-ROM, Random House, 2001, 7 pages.
Random House Webster's College Dictionary with CD-ROM, Random House, 2001, 4 pages.
Random House Personal Computer Dictionary, Second Edition, Philip E. Margolis (Ed.), Random House, New York, 1996, 5 pages.
The IEEE Standard Dictionary of Electrical and Electronics Terms, Sixth Edition, 1996, 36 pages.
The IEEE Standard Dictionary of Electrical and Electronics Terms, Sixth Edition, 1996, 8 pages.
McGraw-Hill Electronics Dictionary, Sixth Edition, Neil Sclater et al. (Ed.), McGraw-Hill, 1997, 3 pages.
Modern Dictionary of Electronics, Sixth Edition, Rudolf Graf (Ed.), Newnes (Butterwoth-Heinemann), 1997, 5 pages.
The American Heritage Dictionary, Fourth Edition, Dell (Houghton-Mifflin), 2001, 5 pages.
The American Heritage Dictionary, Second College Edition, Houghton Mifflin, 1982, 23 pages.
The American Heritage Dictionary, Second College Edition, Houghton Mifflin, 1982, 8 pages.
The American Heritage Dictionary, Third Edition, Dell Publishing (Bantam Doubleday Dell Publishing Group, Inc.), 1994, 4 pages.
The American Heritage Dictionary, Fourth Edition, Dell/Houghton Mifflin 2001, 5 pages.
Webster's New Collegiate Dictionary, Merriam Co., 1981, 5 pages.
Webster's New Collegiate Dictionary, Merriam Co., 1981, 4 pages.
The Oxford American Dictionary and Language Guide, Oxford University Press, 1999, 5 pages.
The Oxford Duden German Dictionary, Edited by the Dudenredaktion and the German Section of the Oxford University Press, W. Scholze-Stubenrecht et al. (Eds), Clarendon Press, Oxford, 1990, 7 pages.
Oxford Dictionary of Computing, Oxford University Press, 2008, 4 pages.
Modern Dictionary of Electronics, Sixth Edition Revised and Updated, Rudolf F. Graf (Ed.), Butterworth-Heinemann, 1997, 7 pages.
Modern Dictionary of Electronics, Sixth Edition Revised and Updated, Rudolf F. Graf (Ed.), Butterworth-Heinemann, 1997, 5 pages.
Garner's Modern American Usage, Bryan A. Garner (Ed.), Oxford University Press, 2003, 3 pages.
The New Fowler's Modern English Usage, R.W. Burchfield (Ed.), Oxford University Press, 2000, 3 pages.
Wikipedia, the free encyclopedia, "Granularity," at http://en.wikipedia.org/wiki/Granularity, Jun. 18, 2010, 4 pages.
Wordsmyth, The Premier Educational Dictionary—Thesaurus, at http://www.wordsmyth.net, "communication," Jun. 18, 2010, 1 page.
Yahoo! Education, "affect," at http://education.yahoo.com/reference/dictionary/entry/affect, Jun. 18, 2010, 2 pages.
mPulse Living Language, "high-level," at http://www.macmillandictionary.com/dictionary/american/high-level, Jun. 18, 2010, 1 page.
MSN Encarta, "regroup," at http://encarta.msn.com/encnet/features/dictionary/Dictionary/Results.aspx?lextype=3&search=regroup, Jun. 17, 2010, 2 pages.
MSN Encarta, "synchronize," at http://encarta.msn.com/encnet/features/dictionary/DictionaryResults.aspx?lextype--3&search--synchronize, Jun. 17, 2010, 2 pages.
MSN Encarta, "pattern," at http://encarta.msn.com/encnetfeatures/dictionary/DictionaryResults.aspx?lextype=3&search=pattern, Jun. 17, 2010, 2 pages.
MSN Encarta, "dimension," at http://encarta.msn.com/encnet/features/dictionary/DictionaryResults.aspx?lextype=3&search=dimension, Jun. 17, 2010, 2 pages.
MSN Encarta, "communication," at http://encarta.msn.com/encnet/features/dictionary/DictionaryResults.aspx?lextype=3&search=communication, Jun. 17, 2010, 2 pages.
MSN Encarta, "arrangement," at http://encarta.msn.com/encnet/features/dictionary/DictionaryResults.aspx?lextype=3&search=arrangement, Jun. 17, 2010, 2 pages.
MSN Encarta, "vector,"at http://encarta.msn.com/encnet/features/dictionary/DictionaryResults.aspx?lextype=3&search=vector, Jul. 30, 2010, 2 pages.
Dictionary.com, "address," at http://dictionary.reference.com/browse/address, Jun. 18, 2010, 4 pages.
P.R . 4-3 Joint Claim Constructions Statement, *PACT XPP Technologies, AG v. Xilinx, Inc. and Avnet, Inc. et al.*, E.D. Texas, 2:07-cv00563-CE, Jul. 19, 2010, pp. 1-50.
Order Granting Joint Motion for Leave to File an Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, 72 pages.
P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 3, 2010, pp. 1-65.
Exhibit A—P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, pp. 1-66.
PACT's Opening Claim Construction Brief, *PACT XPP Technologies, AG v. Xilinx, Inc. and Avnet, Inc. et al.*, E.D. Texas, 2:07-cv00563-CE, Nov. 1, 2010, pp. 1-55.
Declaration of Harry L. (Nick) Tredennick in Support of PACT's Claim Constructions, *PACT XPP Technologies, AG v. Xilinx, Inc. and Avnet, Inc. et al.*, E.D. Texas, 2:07-cv-00563-CE, Nov. 1, 2010, pp. 1-87.
Transcript of Harry (Nick) L. Tredennick III, Ph.D., Oct. 11, 2010, vol. 1, Exhibit 16 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-3.
Agreed and Disputed Terms, Exhibit 17 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-16.
Oral Videotaped Deposition—Joseph McAlexander dated Oct. 12, 2010, vol. 1, Exhibit 18 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-17.
Expert Report of Joe McAlexander Re Claim Construction dated Sep. 27, 2010, Exhibit 19 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-112.
Documents from File History of U.S. Appl. No. 09/290,342, filed Apr. 12, 1999, Exhibit 20 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-37.
Amendment from File History of U.S. Appl. No. 10/156,397, filed May 28, 2002, Exhibit 25 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Documents from File History U.S. Appl. No. 09/329,132, filed Jun. 9, 1999, Exhibit 27 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-36.
Amendment from File History of U.S. Appl. No. 10/791,501, filed Mar. 1, 2004, Exhibit 39 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-9.

Amendment from File History of U.S. Appl. No. 10/265,846, filed Oct. 7, 2002, Exhibit 40 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.

Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-55.

Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG v. Xilinx, Inc. and Avnet, Inc. et al.*, E.D. Texas, 2:07-cv-00563-CE, Dec. 6, 2010, pp. 1-5.

Oral Videotaped Deposition Joseph McAlexander (Oct. 12, 2010), Exhibit 1 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.

Expert Report of Joe McAlexander re Claim Construction, Exhibit 2 of Defendants Xilinx, Inc. and Avnet, Inc.'s Responsive Claim Construction Brief, *PACT XPP Technologies, AG v. Xilinx, Inc. and Avila Inc. et al.*, E.D. Texas, 2:07-cv-00563-CE, Dec. 6, 2010, pp. 1-137.

Documents from File History of U.S. Appl. No. 09/290,342, filed Apr. 12, 1999, Exhibit 6 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-181.

Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-28.

Amendment, Response from File History of U.S. Appl. No. 10/156,397, filed May 28, 2002, Exhibit 15 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-137.

Application from File History of U.S. Appl. No. 08/544,435, filed Nov. 17, 1995, Exhibit 20 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-102.

Documents from File History of U.S. Appl. No. 09/329,132, filed Jun. 9, 1999, Exhibit 24 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-13.

Documents from File History of U.S. Appl. No. 10/791,501, filed Mar. 1, 2004, Exhibit 25 of Defendants Xilinx, Inc. And Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-14.

Amendment from File History of U.S. Appl. No. 11/246,617, filed Oct. 7, 2005, Exhibit 26 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.

Documents from File History of U.S. Appl. No. 08/947,254, filed Oct. 8, 1997, Exhibit 27 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-38.

Documents from File History of U.S. Appl. No. 08/947,254, filed Oct. 8, 1997, specifically, German priority application specification [English translation provided], Exhibit 33 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, 54 pages [including English translation].

Documents from File History of U.S. Appl. No. 09/335,974, filed Jun. 18, 1999, Exhibit 28 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-32.

Documents from File History of U.S. Patent Reexamination Control No. 90/010,450 (filed Mar. 27, 2009), Exhibit 30 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-71.

Documents from File History of U.S. Appl. No. 10/265,846, filed Oct. 7, 2002, Exhibit 32 of Defendants Xilinx, Inc. and Avnet, Inc.'s Responsive Claim Construction Brief, *ACTt XPP Technologies, AG v. Xilinx, Inc. and Avnet, Inc. et al.*, E.D. Texas, 2:07-cv-00563-CE, Dec. 6, 2010, pp. 1-23.

PACT's Claim Construction Reply Brief, *PACT XPP Technologies, AG v. Xilinx, Inc. and Avnet, Inc. et al.*, E.D. Texas, 2:07-cv-00563-CE, Jan. 7, 2011, pp. 1-20.

Defendants Xilinx, Inc. and Avnet, Inc.'s Claim Construction Sur-reply Brief, *PACT XPP Technologies, AG v. Xilinx, Inc. and Avnet, Inc. et al.*, E.D. Texas, 2:07-cv-00563-CE, Jan. 18, 2011, 142 pages.

Markman Hearing Minutes and Attorney Sign-In Sheet, *PACT APP Technologies, AG v. Xilinx, Inc. and Avnet, Inc. et al.*, E.D. Texas, 2:07-cv-00563-CE, Feb. 22, 2011, 3 pages; and court transcript, 245 pages.

Memorandum Opinion and Order, *PACT XPP Technologies, AG v. Xilinx, Inc. and Avnet, Inc. et al.*, E.D. Texas, 2:07-cv-00563-CE, Jun. 17, 2011, pp. 1-71.

Atmel Corporation, Atmel 5-K-50K Gates Coprocessor FPGA and FreeRAM, (www.atmel.com), Apr. 2002, pp. 1-68.

Glaskowsky, Peter N., "PACT Debuts Extreme Processor; Reconfigurable ALU Array Is Very Powerful—and Very Complex," The Insider's Guide to Microprocessor Hardware, MicroDesign Resources—Micoprocessor Report, Oct. 9, 2000 (www.MPRonline.com), 6 pages.

Glaskowsky, Peter N., "Analysis' Choice Nominees Named; Our Picks for 2002's Most Important Products and Technologies," The Insider's Guide to Microprocessor Hardware, MicroDesign Resources—Micoprocessor Report, Dec. 9, 2002 (www.MPRonline.com), 4 pages.

Lattice Semiconductor Corporation, "ispLSI 2000E, 2000VE and 2000 VL Family Architectural Description," Oct. 2001, pp. 1-88.

Olukotun, K. et al., "Rationale, Design and Performance of the Ilydra Multiprocessor," Computer Systems Laboratory, Stanford University, CA, Nov. 1994, pp. 1-19.

PACT Corporate Backgrounder, PACT company release, Oct. 2008, 4 pages.

Page, Ian., "Reconfigurable processor architectures," Oxford University Computing Laboratory, Oxford UK, Elsevier Science B.V., Microprocessors and Microsystems 20 (1996) pp. 185-196.

Singh, Hartej et al., "Morpho-Sys: A Reconfigurable Architecture for Multimedia Applications," Univ. of California, Irvine, CA and Federal University of Rio de Janiero, Brazil, IEEE Transactions on Computers, 1998 at http://www.eng.uci.edu/morphosys/docs/sbcci98.html, 10 pages.

Theodoridis, G. et al., "Chapter 2—A Survey of Coarse-Grain Reconfigurable Architectures and Cad Tools, Basic Definitions, Critical Design Issues and Existing Coarse-grain Reconfigurable Systems," from S. Vassiliadis, and D. Soudris (eds.) *Fine- and Coarse-Grained Rerconfigurable Computing*, Springer 2007, pp. 89-149.

Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.

Xilinx, XC6200 Field Programmable Gate Arrays, Advance Product Specification, Jun. 1, 1996 (Version 1.0), pp. 4-255 through 4-286.

Xilinx, Virtex-II Platform FPGA User Guide, UG002 (V2.1) Mar. 28, 2007, pp. 1-502 [Parts 1-3].

(86) Xilinx, XC4000E and SC4000X Serial Field Programmable Gate Arrays, Product Specification (Version 1.6), May 14, 1999, pp. 1-107.

\* cited by examiner

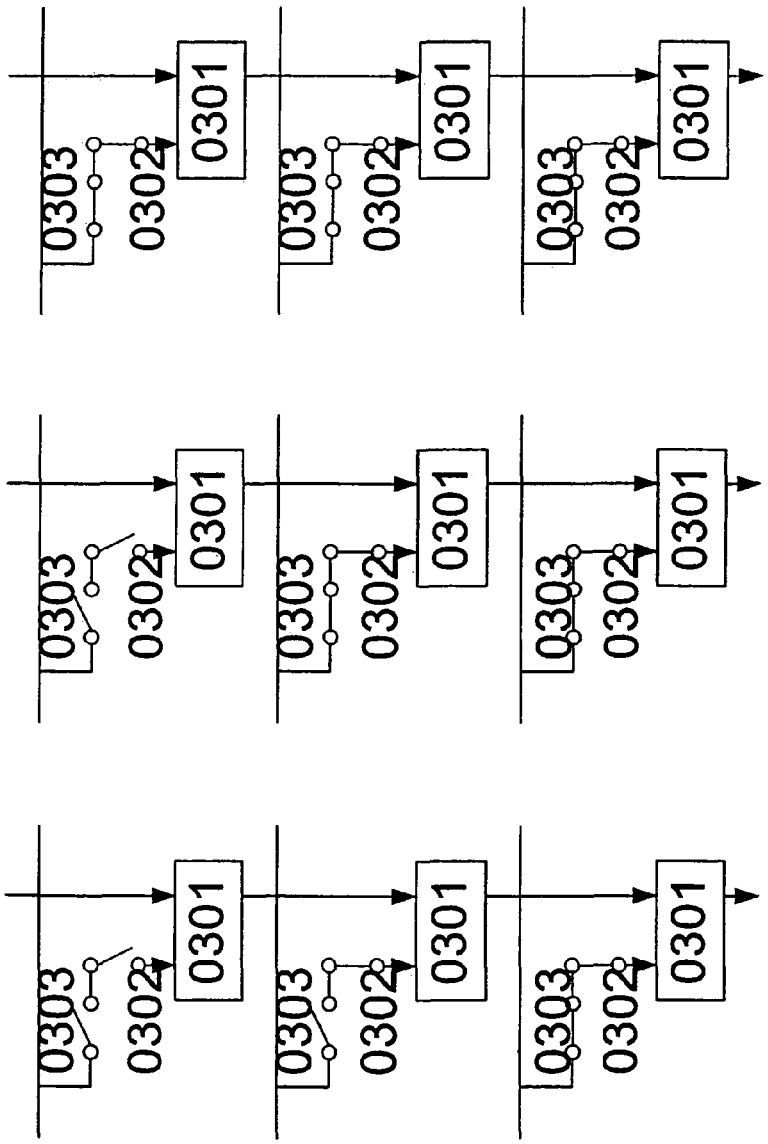

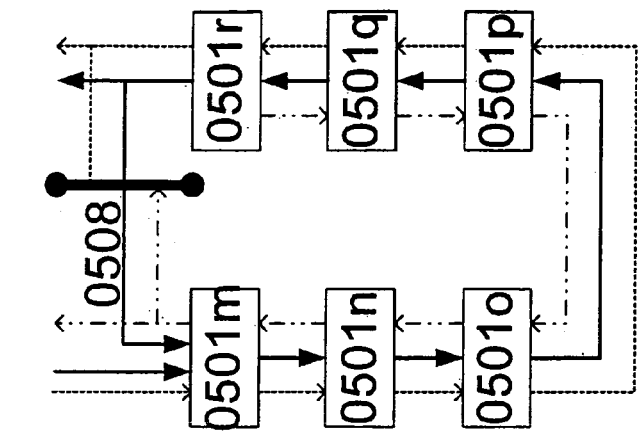
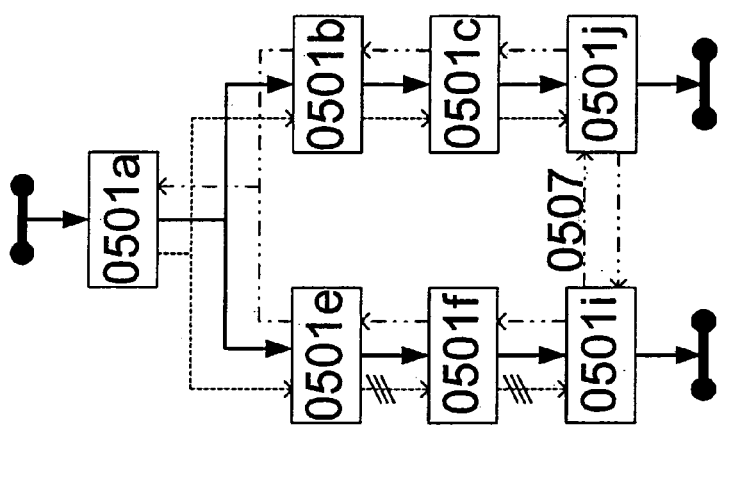
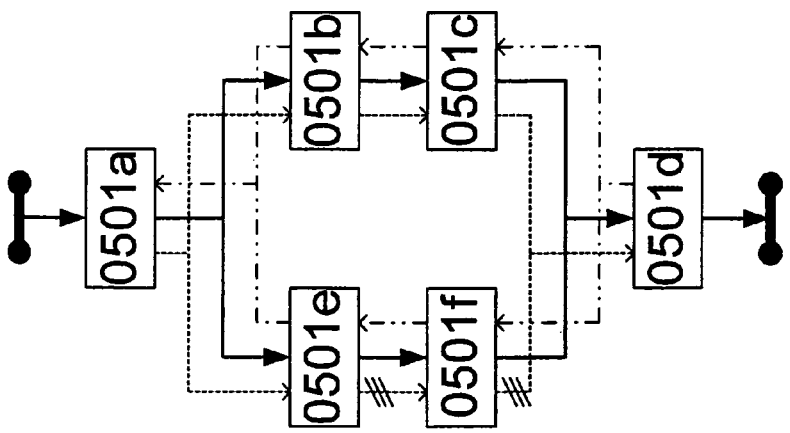
Fig. 5c
Fig. 5b
Fig. 5a

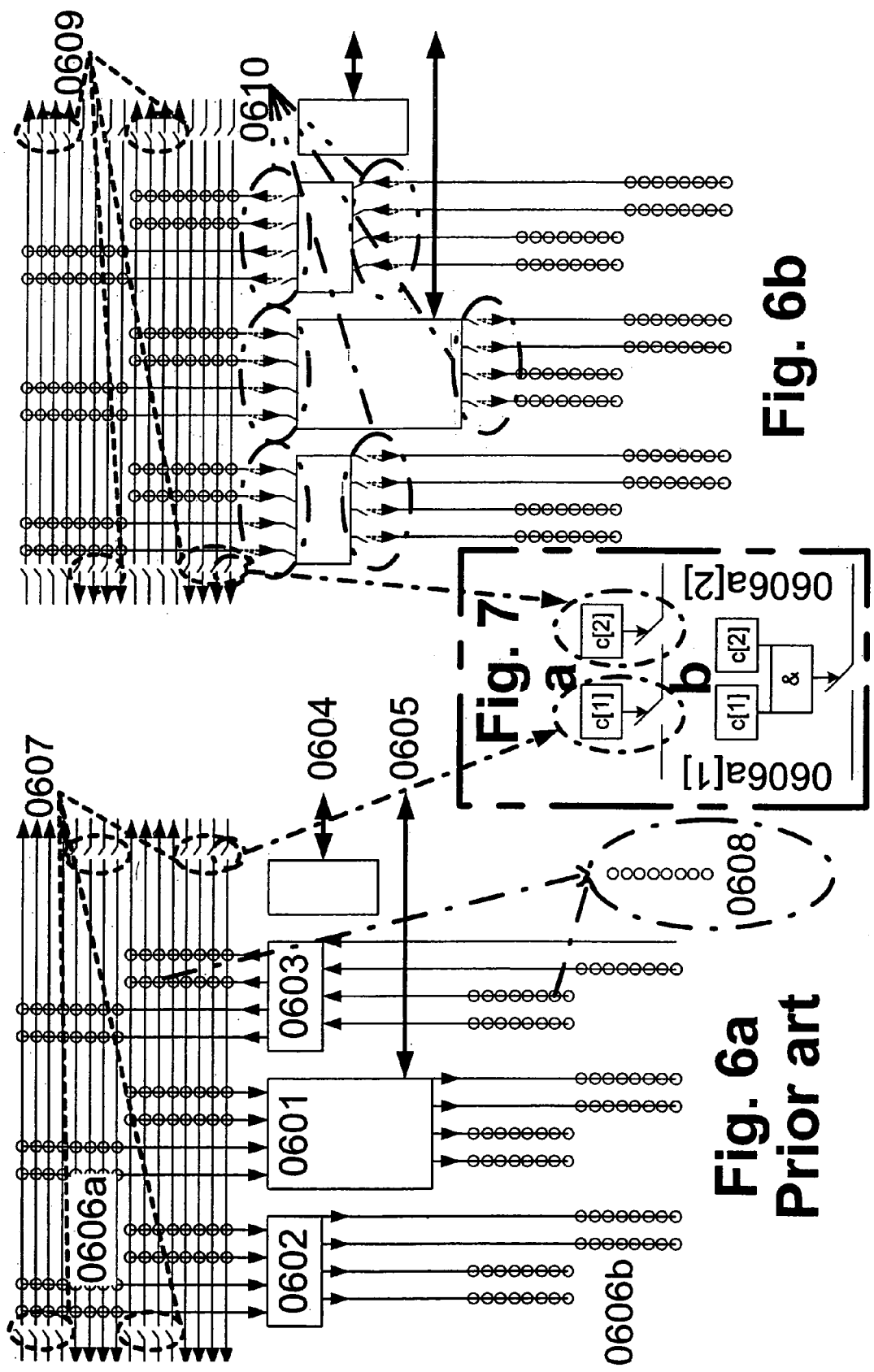

RDY ACK – Protocol

Frequency-enhanced structure

Double receiver input register

Credit FIFO having register outputs

Credit System Timing

General RDY/ABLE timing

RDY/ABLE timing with pulsed data

Hardware for receiving and sending data using the RDY/ABLE protocol

BUS SYSTEMS AND RECONFIGURATION METHODS

FIELD OF THE INVENTION

The present invention relates to methods and embodiments of bus systems for configurable architectures. The optimization of the configuration and reconfiguration efficiency is taken into account in particular.

BACKGROUND INFORMATION

A reconfigurable architecture is understood to refer to modules (VPUs) having a configurable function and/or interconnection, in particular integrated modules having a plurality of arithmetic and/or logic and/or analog and/or storing and/or interconnecting modules (hereinafter referred to as PAEs) arranged in one or more dimensions and/or communicative peripheral modules (IO) interconnected directly or via one or more bus systems. PAEs may be of any embodiment or mixture and arranged in any hierarchy. This arrangement is referred to below as a PAE array or PA.

Generic modules of this type include systolic arrays, neural networks, multiprocessor systems, processors having multiple arithmetic units and/or logic cells, interconnecting and network modules such as crossbar switches, as well as known modules of the types FPGA, DPGA, XPUTER, etc. In this context, reference is made in particular to the following patents and applications by the present applicant: P 44 16 881.0-53, DE 197 81 412.3, DE 197 81 483.2, DE 196 54 846.2-53, DE 196 54 593.5-53, DE 197 04 044.6-53; DE 198 80 129.7, DE 198 61 088.2-53, DE 199 80 312.9, PCT/DE 00/08169, DE 100 36 627.9-33, DE 100 28 397.7, DE 101 10 530.4, DE 101 11 014.6, PCT/EP 00/10516, EP 01 102 674.7, PACT02, PACT04, PACT05, PACT08, PACT10, PACT11, PACT13, PACT21, PACT13, PACT18, PACT19, PACT16, PACT25, PACT27, PACT26/US, which are herewith incorporated to the full extent for the purpose of disclosure.

BRIEF DESCRIPTION OF THE DRAWINGS

FIGS. 3a-3b show a bus system in various states of configuration, and the use of switches for connecting an input of a processing element, according to an example embodiment of the present invention.

FIGS. 5a-5c show examples of processing elements with differently configured interconnections, and signal propagation in the case of branching or loops.

FIG. 6a shows a conventional bus design.

FIG. 6b shows a bus design according to an example embodiment of the present invention.

FIG. 7 shows different types of connections between busses using either one switch or two switches and using configuration bits to determine the states of the switches, according to example embodiments of the present invention.

Figure 1:
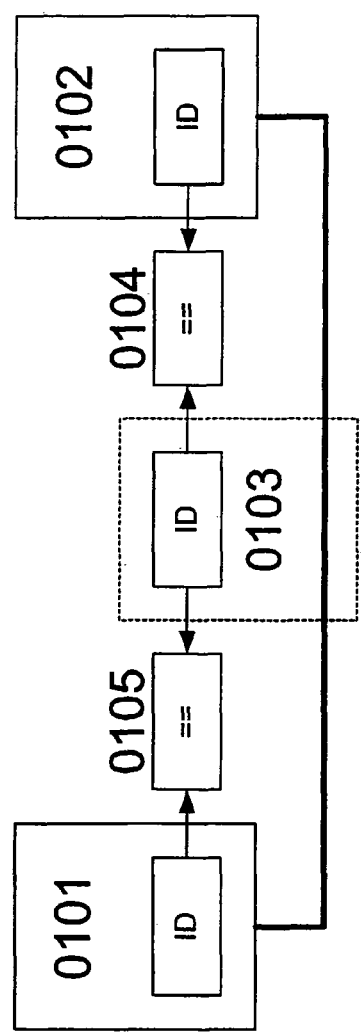
FIG. 1 shows the two processing elements, a bus, and their IDs.

The architecture indicated above is used as an example for illustration and is referred to below as a VPU. This architecture has any number of arithmetic or logic cells (including memories) and/or memory cells and/or interconnection cells and/or communicative/peripheral (IO) cells (PAEs), which may be arranged to form a one-dimensional or multidimensional matrix (PA), which may have different cells of any configuration. Bus systems are also understood to be cells. The matrix as a whole or parts thereof are assigned a configuration unit (CT), which influences the interconnection and function of the PA. Improvements are still possible with such architectures, e.g., with regard to the procedure and/or speed of reconfiguration.

DETAILED DESCRIPTION

The object of the present invention is to provide a novel approach for commercial use.

The means for achieving this object is claimed independently. Preferred embodiments are characterized in the subclaims.

1. Structure of Bus Systems

Conventional implementation of configuration requires synchronization between the objects. Objects are understood to refer to all data processing modules (PAEs) and, inasmuch as necessary, also the data transferring modules such as bus systems. This synchronization is implemented centrally, e.g., via a FILMO (see PACT04, PACT05, PACT10, PACT17). Therefore, at least as many cycles elapse between the end of an old configuration (reconfig trigger; see PACT08) and the beginning of a new configuration (object again enters the "configured" state) as would correspond to the length of the pipelined CM bus (forward and return; see PACT17).

According to the present invention, two methods are proposed for accelerating this procedure:

a) the required sequence is ensured by additional logic in the objects, e.g., management of IDs;

b) the objects are modified so that it is no longer necessary to take the sequence into account and instead the proper interconnection is ensured by the architecture of the objects.

For the following considerations, the modules present in a typical reconfigurable architecture are divided into two groups:

Buses: This group includes the connecting line between two segments. It is represented by the segment switch at one end.

Object: This group includes all the objects which have a connection to a bus and/or communicate with its environment, i.e., any PAE (e.g., memory, ALUs), IO, etc.

Typically there are dependencies mainly among all directly adjacent objects, including specifically:

Bus to bus: A bus is represented by the segment switch at the end of a bus.

Object to bus: The object is to be selected freely from FREG, BREG, ALU and RAM. Everything that has a connection is likewise counted as an object in this sense.

Object to object: These are not usually directly adjacent and there is normally a bus in between. There is then no dependence. In the case of a direct connection, the connection behaves according to "bus to bus" and/or "object to bus" depending on the embodiment.

1.1 Bus-to-Bus Dependence in the related art, longer buses are configured from back to front, for example. An example of the bus design described below is illustrated in FIG. 6a. The last bus segment (0606a) is configured with an open bus switch (0607) while all others are configured with a closed bus switch. The sequence must be preserved to prevent data from running from a bus that is closer to the front to a bus that is closer to the rear which still belongs to another configuration.

1.2 Bus-to-Object Dependence

According to the related art, an object (e.g., 0601, 0602, 0603) may not be configured until it is ascertained that the buses (0606a, 0606b) used by the object have already been configured. This dependence also exists to ensure that no data is running into a foreign configuration (PAE output) and/or is taken from a foreign configuration (PAE input).

In summary, it may be concluded that there is always a dependence when an object establishes, has established and/or wishes to establish a connection to another object. This takes place by way of the connection mask (0608) which controls the connection of the object inputs and/or outputs onto the buses (e.g., via multiplexers, transmission gates and the like; see also PACT18, FIG. 5 and FIG. 7c) and/or closed bus switches (0607) which permit the transfer of information via a bus (e.g., from one segment (0606a[1]) to another segment (0606a[2]). In other words, this connection mask indicates which horizontal bus structure is connected to which vertical bus structure and where this occurs; the fact that a "lane change" to a horizontal bus structure, for example, is also possible should be mentioned for the sake of thoroughness. The connection must not be established until it is ascertained that the object to which the connection is to be established already belongs to the same configuration, i.e., has already been configured accordingly.

2. Control Over ID Management

The first approach claimed according to the present invention is to store the IQ or array ID currently being used by the object in each object (see PACT10). Therefore, information regarding which task and/or configuration the particular object is being assigned to at the moment is stored. As soon as a connection between two objects is configured (e.g., between a PAE output and a bus), a check is performed in advance to determine whether both objects have the same ID/array ID. If this is not the case, the connection must not be established. Thus a connection is activated and/or allowed, depending on a comparison of identifying information.

Although this method is basically comparatively trivial, it requires a great hardware complexity, because for each possible connection, registers are required for storing the IDs/array IDs and comparators are required for comparing the IDs/array IDs of the two objects to be connected.

FIG. 1 shows the two PAEs (0101, 0102) together with their IDs and a bus (0103) with its ID. Each PAE/bus connection is checked via the comparators (0104, 0105). The figure is used only to illustrate the basic principle without being restrictive. If all resources (inputs/outputs of the PAEs, buses) are taken into account, there is a considerable increase in complexity and the associated hardware expenditure. A method according to the present invention which is implemented much more favorably from a technical standpoint and is therefore preferred is discussed in the following sections.

3. Control Over the Interconnection Structure

Figure 2:
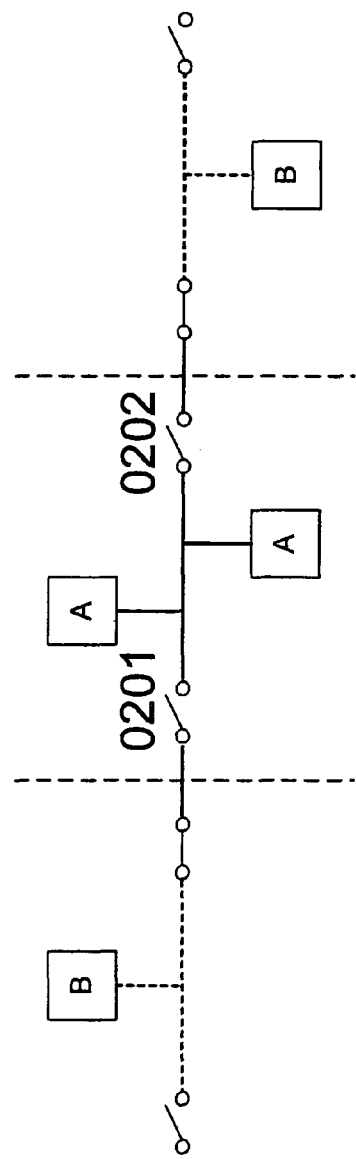
FIG. 2 shows a bus segment with double switches for controlling data flow between bus segments, according to an example embodiment of the present invention.

FIG. 2 shows a bus segment needed by configurations A and B. However, it is still occupied by configuration A, as shown here. Configuration B may already occupy the two neighboring bus segments independently thereof. According to the present invention, through the new double bus switches (0201 and 0202, corresponding to 0607 and, according to FIG. 6b, 0609), the possibility may be ruled out that data from configuration B will interfere with the data flow of configuration A. Likewise, no data runs from configuration A to B. In the case of configuration B, it is assumed that configuration A has been correctly implemented and that the bus switch at the output is open.

As soon as configuration A is concluded, the bus thus released is occupied by configuration B and configuration B begins to work.

In other words, one basic principle of the method is that each element involved in a data transmission connects itself automatically to the corresponding data source and/or the data transmitter, i.e., it has the control itself of which data transmitter/receiver it is to be connected to according to the configuration.

Bus to PAE Input

FIG. 3 shows a PAE input (0301) which is to be connected to the two lower buses of the three buses shown here. The vertical switches correspond to a simple connection switch of the connection mask (0608) for connection to the bus and are managed by the PAE (0302), and in addition, the horizontal switches (0303, corresponding to 0610) are also configured via the bus to ensure a correct connection.

The middle bus in FIG. 3a is still occupied by another configuration. Nevertheless the object may be configured completely using the PAE input. Data from the middle bus cannot run unintentionally into the object because this is prevented by the configuration of the bus (switch 0303).

In FIG. 3b the old configuration has been terminated and replaced by the new configuration. Now both buses are available. To determine which buses are in fact connected, only the vertical switches (0302) are used.

Finally, the upper bus in FIG. 3c is occupied by a third configuration, which would also like to use the PAE input shown. Therefore, the bus is configured so that data may be withdrawn at this point. However, this has no effect on the object because the PAE configuration does not provide any connection at this point. The connection is thus not established until the configuration of the PAE input changes.

Bus-PAE Output

This is a connection in which the use of two separate switches is particularly preferred. It may be preferable in the (two) other cases to implement the functionality with one switch which is controlled by two config bits which are interlinked by Boolean logic, preferably by an AND link, to determine the switch state. FIG. 4 shows a PAE output which is to be connected to the two lower buses of the three buses illustrated here. The object is configured independently of the availability of the buses, the switches on the left in the figure corresponding to the connection mask.

Figure 4C:
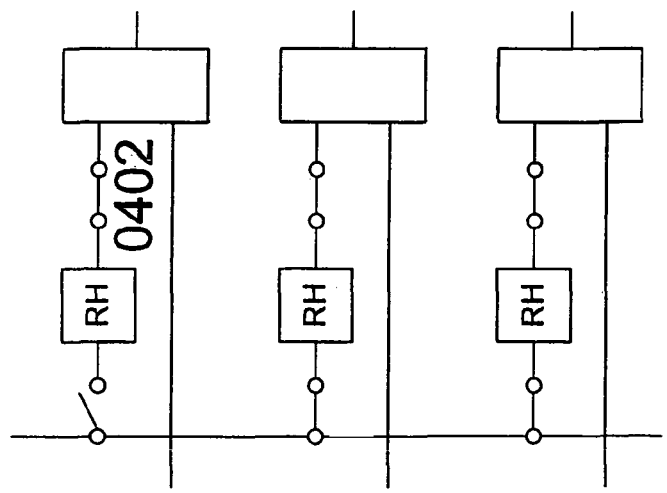
FIGS. 4a-4b show a bus system in various states of configuration, and the use of switches and RdyHold stages for connecting an output of a processing element, according to an example embodiment of the present invention.
Figure 4B:
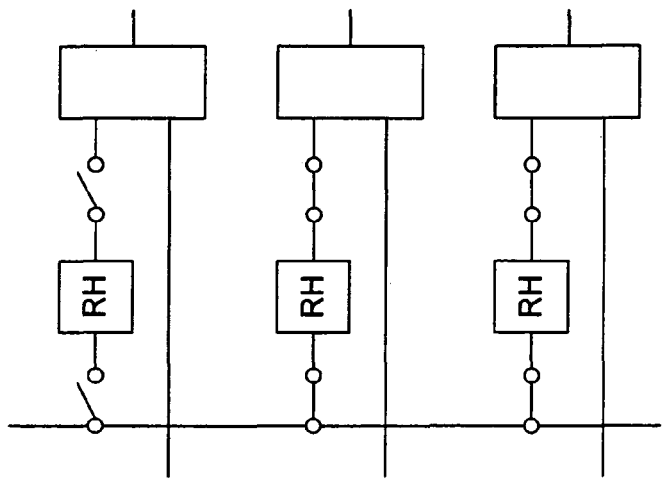
Figure 4A:
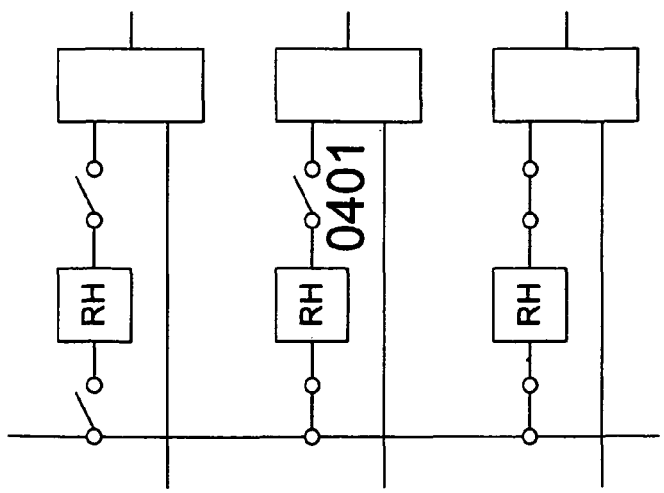

The middle bus (0401) in FIG. 4a is still occupied by another configuration. Now a data packet may be sent from the output register to the connection. It is stored in the connected RdyHold (see PACT18) stages. The packet may not be transmitted through the opened switch of the middle bus and thus also may not be acknowledged, i.e., the transmitter does not receive an acknowledgment of receipt. Thus the object may not transmit any further data packets with the usual protocols.

Now in FIG. 4b the middle bus has been reconfigured, i.e., the switch closed, so that data may again be transmitted here. A packet that has possibly already been stored is now on the bus; otherwise everything functions like before.

In FIG. 4c the top bus (0402) is requested by a third configuration. The switch on the bus side behind the RM remains ?? open accordingly, because data transfer is to be prevented on the bus side. Here again, everything otherwise behaves like before.

Result

The reconfiguration performance may be increased substantially with relatively simple hardware. In particular, it is thus even more possible to preload multiple complete configurations into the objects because the objects may then be configured individually per object and independently according to the prevailing data processing status of each without any problems being expected.

After arrival of the reconfiguration signal requesting reconfiguration, each object until it is configured again needs locally only as many cycles as configuration words are necessary when transmission of configuration words in cycles is assumed. The reconfiguration time may be pushed further by using a second register set, approximately toward zero cycles, when configurations are predeposited in the second register set.

In an optimized implementation that is preferred according to the present invention, the additional hardware complexity for buses and PAE inputs may be limited to one additional configuration bit and one AND gate per bus switch and per number of buses×number of PAE inputs. This is depicted in FIG. 7.

FIG. 7a shows a left-hand bus (0606a[1]) connected to a right-hand bus (0606a[2]) via the bus switch. A configuration switch is assigned to each bus switch, indicating whether the switch is configured as being open or closed (c[1] for the left-hand bus and c[2] for the right-hand bus). In FIG. 7b the same function is implemented by a single switch instead of two switches. The two configuration bits c[1] and c[2] are logically linked together by an AND gate (&) so that the single switch is closed only when both configuration bits in this example are logic b'1. Alternatively, an implementation via an OR gate is appropriate when a logic b'0 is to display a closed switch.

The PAE outputs may optionally require slightly more complexity, depending on the implementation, if an additional switch is considered to be necessary for each. In this connection, it should be pointed out that although it is possible to provide the connection to and/or between all objects according to the present invention, this is by no means obligatory. Instead it is possible to implement the ideas according to the present invention only in some objects.

FIG. 6b shows as an example a design of an object and a bus according to the present invention. The basic design corresponds to the related art according to FIG. 6a and/or according to PACT18, FIGS. 5 and 7c. Therefore, only the elements in FIG. 6b that are novel in comparison with the related art will be described anew here. The switches on bus ends 0609 are inserted according to the present invention, so the buses are completely separable by switches 0607 and 0609. Switches (0610) at the inputs and outputs of the objects (PAEs), regulating the correct connections to the buses, are also novel.

The basic principle now is that each object and/or each bus independently regulates, i.e., determines, which connections are to be established and/or remain in effect at the moment. It should be pointed out here that this determination is performed by the individual object and/or bus depending on the configuration, i.e., it is by no means arbitrary. Management of the connections is thus more or less delegated to the objects involved. Each bus may regulate which other buses it will be connected to via switches 0607 and 0609 according to the configuration. No bus may now be connected to another (e.g., via 0607) without the other bus allowing this through a corresponding switch setting of its bus switches (e.g., 0609).

It should be pointed out explicitly that switch 0607 according to the related art could also be situated at the output of a bus and switch 0609 is added at the input of the buss accordingly.

Switches 0610 are preferably also double switches, one switch being controlled by the PAE object and the other switch being controlled by the particular bus system 0606a and/or 0606b. It should be pointed out in particular that one switch is merely indicated with dashed lines. This is the switch controlled by bus 0606a and/or 0606b and it may be implemented "virtually" by the setting of the connection mask (0608).

5. Reconfiguration Control

Control of the reconfiguration is triggered in the VPU technology by signals (Reconfig) which are usually propagated with the data packets and/or trigger packets over the bus systems and indicate that a certain resource may or should be reconfigured and, if necessary, the new configuration is selected at the same time (see PACT08, PACT13).

If a reconfigurable module is to be only partially reconfigured, then Reconfig must be interrupted at certain locations according to the algorithm. This interruption, which prevents forwarding of Reconfig, is referred to as ReconfigBlock.

ReconfigBlocks are usually introduced at the boundary of one configuration with the next to separate them from one another.

Different strategies for sending Reconfig signals are selected as requested by the algorithm.

Now three possible and preferred embodiments will be described; these embodiments may be used individually and/or combined and they have different behaviors. It is regarded as inventive in comparison with the related art that it is possible to select between such embodiments in pairs.

a) ForcedReconfig: The simplest strategy is to send the Reconfig signal via all interfaces of an object, i.e., it propagates along the data paths and/or trigger paths belonging to a certain configuration while other configurations remain unaffected. This ensures that all interconnected objects in the PA receive the signal. For the sake of restriction, the signal must be blocked at suitable locations. This method, i.e., signal, ensures that a configuration is removed completely. The signal is referred to below as ForcedReconfig. This signal should be used only after all data in the particular objects has been processed and removed because there is no synchronization with data processing. Although all objects belonging to a certain configuration within an array are thus forced to allow reconfiguration, other configurations running simultaneously on other objects of the same array remain unaffected.

b) SyncReconfig: A Reconfig is sent together with the corresponding data and/or triggers. It is sent only together with active data packets and/or trigger packets. The signal is preferably relayed together with the last data packet and/or trigger packet to be processed and indicates the end of the data processing after this data/trigger packet. If a PAE requires multiple cycles for processing, the forwarding of SyncReconfig is delayed until the trigger packet and/or data packet has in fact been sent. This signal is thus synchronized with the last data processing. As described below, this synchronized reconfiguration according to the present invention may be blocked at certain locations.

c) ArrayReset: ArrayReset may be used as an extension of ForcedReconfig which cannot be blocked and results in reconfiguration of the complete array. This method is particularly appropriate when, for example, an application is terminated or an illegal opcode (see PACT19) and/or timeout of a configuration has occurred and proper termination of the configuration cannot be ensured with other strategies. This is important for a power-on reset, or the like, in particular.

5.1 SyncReconfig

When SyncReconfig is propagated, it always contains valid active data or triggers.

Problems occur when, in the case of branching, the signal is propagated only in the active branch (FIG. 5a) or when branching or combining is blocked due to lack of data and/or triggers. (FIG. 5b).

To solve this problem, the semantics of SyncReconfig is defined as follows: The signal indicates that after receiving and completely processing the data/triggers, all the data/trigger sources (sources) and buses leading to the input of an object which has received the SyncReconfig signal are reconfigured. A ReconfigEcho signal may be introduced for this purpose. After the arrival of SyncReconfig at a destination object, a ReconfigEcho is generated by it, preferably only and as soon as the destination object has completely processed the data arriving with the SyncReconfig signal. This generated ReconfigEcho is then sent to all sources connected to the object, i.e., its inputs, and results in reconfiguration, i.e., reconfigurability of the sources and/or the bus systems transmitting data and/or triggers.

If an object receives a ReconfigEcho, this signal is transmitted further upstream, i.e., it is transmitted via the buses to its sources via all the inputs having bus switches still closed. After being generated, ReconfigEcho is thus sent to the data and/or trigger sources that feed into an object, and the signals are forwarded from there. Inputs/outputs that have already received a SyncReconfig preferably become passive due to its arrival, i.e., they no longer execute any data/trigger transfers. Depending on the embodiment, a SyncReconfig may only induce passivation of the input at which the signal has arrived or passivation of all inputs of the PAE.

A ReconfigEcho usually arrives at the outputs of PAEs. This causes the ReconfigEcho to be relayed via the inputs of the PAE if they have not already been passivated by a received SyncReconfig.

In some cases, e.g., in FIGS. 5a through c, ReconfigEcho may also occur at the inputs. This may result in passivation of the input at which the signal arrived, depending on the embodiment, or in a preferred embodiment it may trigger passivation of all inputs of the PAEs.

5.2 Trigger Having Reconfig Semantics

In some cases (e.g., FIG. 5b) an implicit propagation of the Reconfig signals (in particular SyncReconfig, ReconfigEcho) is impossible.

For the required explicit transmission of any Reconfig signals, the trigger system according to PACT08 may be used, to which end the trigger semantics is extended accordingly. Triggers may thus transmit any status signals and control signals (e.g., carry, zero, overflow, STEP, STOP, GO; see PACT08, PACT13, PACT18), as well as the implicit Reconfig signals. In addition, a trigger may assume the SyncReconfig, ReconfigEcho, or ForcedReconfig semantics.

5.3 Blocking

At each interface which sends a SyncReconfig, it is possible to set whether sending or relaying is to take place. Suppressing propagation results in stopping a reconfiguration wave that would otherwise propagate over the array and/or the configuration affected by it. However, regardless of the blockades to be set up for certain locations during configuration in a self-modifying or data-dependent manner and/or under or for certain conditions, it should be mentioned that data and/or trigger signals may continue to run over a blocked position, in order to be processed further as before, as provided with the protected configuration and/or a protected configuration part.

If necessary, it would also be possible to locally suppress the response to the reconfiguration request, i.e., to ignore the reconfiguration request locally but nevertheless send a signal indicative of the arrival of a locally ignored reconfiguration request signal to downstream objects, whether blocked or unblocked.

As a rule, however, when individual objects of a configuration are to be blocked, it is preferable to send the reconfiguration request signal over separate buses, bus segments or lines to downstream objects past a blocking object. The normally preferred case in which the reconfiguration request signal must penetrate into the object is then easier to maintain, i.e., not only peripherally relayed in forward or reverse registers, if provided, and thus sent past the actual cell. It is then preferable that, in the case of blocking of a reconfiguration request signal (or a certain reconfiguration request signal of a plurality of differentiable reconfiguration request signals), this blocked reconfiguration request signal "dies" in the particular object, i.e., is not to be forwarded.

If the acceptance of SyncReconfig at the receiving interface is blocked, then the receiving object switches the interface receiving SyncReconfig to passive (i.e., the interface no longer sends and/or receives any data); otherwise the object does not respond to the signal but it may send back the ReconfigEcho to permit the release of the transmitting bus system.

In addition, it is possible to block ReconfigEcho either independently of and/or jointly with a ReconfigBlock.

5.4 Effect of SyncReconfig and ForcedReconfig on Bus Systems

To ensure that, after transmission of a SyncReconfig over a bus, no subsequent data and/or triggers which originate from a following configuration, for example, and would thus be processed incorrectly are transmitted, SyncReconfig preferably blocks the sending of the handshake signals RDY/ACK (see PACT02), which indicate the presence of valid data on the bus and control the data transmission, over the bus. The bus connections per se, i.e., the data and/or trigger network, are not interrupted to permit resending of ReconfigEcho over the bus system. The bus is dismantled and reconfigured only with the transmission of ReconfigEcho.

In other more general terms, the occurrence of SyncReconfig first prevents data and/or triggers from being relayed over a bus—except for ReconfigEcho—e.g., by blocking the handshake protocols and ReconfigEcho subsequently induces the release and reconfiguration of the bus.

Other methods having an equivalent effect may be used; for example, data and trigger connections may be interrupted even in a run-through of SyncReconfig, whereas the ReconfigEcho connection is dismantled only on occurrence of ReconfigEcho.

This ensures that data and triggers of different configurations which do not belong together will not be exchanged incorrectly via the configurations.

FIG. 5 shows an example PAEs (0501) having differently configured interconnections. The following transmissions are defined: data and/or trigger buses (0502), SyncReconfig (0503), ReconfigEcho (0504). In addition, ReconfigBlock (0505) is also shown; 0506 indicates that SyncReconfig is not relayed.

FIG. 5a illustrates a branching such as that which may occur, for example due to an IF-THEN-ELSE construct in a program. After a PAE, the data is branched into two paths (0510, 0511), only one of which is always active. In the case depicted here, a last data packet is transmitted together with SyncReconfig, branch 0510 is not active and therefore does not relay either the data or SyncReconfig. Branch 0511 is active and relays the data and SyncReconfig. The transmitting bus system may preferably be switched to inactive immediately after the transmission and is then able to transmit back only ReconfigEcho. PAE 0501b receives SyncReconfig and sends it to PAE 0501c, which sends ReconfigEcho back to 0501a, whereupon 0501a and the bus system between 0501a and 0501b are reconfigured. The transmission between 0501b and 0501c takes place accordingly.

0501e has also received SyncReconfig from 0501a but the branch is not active. Therefore 0501e does not respond, i.e., 0501e does not send SyncReconfig to 0501f nor does it send the ReconfigEcho back to 0501a.

0501c processes the incoming data and forwards SyncReconfig to 0501d. This sequence initially corresponds to the transmission from 0501a to 0501b. After processing the data, 0501d generates a ReconfigEcho which is also sent to 0501f because the branches are combined. Although 0501f has not performed a data operation, the unit is reconfigured and sends the ReconfigEcho to 0501e which is then also reconfigured—without new data processing having taken place.

ReconfigEcho transmitted from 0501b to 0501a may also be transmitted in a preferred embodiment to 0501e where it arrives at an input. This results in passivation of the input and to passivation of all inputs in an expanded embodiment, which may also be reconfigurable.

To impart a local character to the examples in FIG. 5, the inputs/outputs in the diagrams have been provided with a ReconfigBlock so that the forwarding of SyncReconfig and ReconfigEcho is suppressed.

FIG. 5b is largely identical to FIG. 5a which is why the same references are also being used. The right-hand path is again active and the left-hand path is inactive. The essential difference is that instead of combining the paths at 0501d, the paths now remain open and lead directly to the peripheral interface, for example. In such cases, it is possible and preferable to provide an explicit wiring of ReconfigEcho via trigger lines (0507) between the PAEs (0501i and 0501j).

FIG. 5c shows the exemplary embodiment of a loop. This loop runs over PAEs 0501m, . . . , 0501r. The transmissions between PAEs 0501m, . . . , 0501r are evidently equivalent here according to the preceding discussion, in particular regarding the transmissions between 0501b and 0501c.

The transmission between 0501r and 0501m deserves special attention. When ReconfigEcho appears at 0501m, the bus (0508) between 0501m and 0501r is reconfigured by the transmission of ReconfigEcho. ReconfigEcho is blocked at the output of 0501r. Therefore 0501r is not reconfigured but the particular output is switched to passive on arrival of ReconfigEcho, i.e., 0501r no longer sends any results on the bus. Therefore the bus may be used by any other configuration.

As soon as 0501r receives ReconfigEcho from 0501q, 0501r is reconfigured at the end of the data processing. The ReconfigBlock and/or the passivation of the bus connection to 0501m (0508) prevents forwarding toward 0501m. Meanwhile 0501m and 0508 may be used by another configuration.

6.0 SyncReconfig II

Another optional method for controlling the SyncReconfig protocol is described below; this method may be preferred, depending on the application, the area of use and/or embodiment of the semiconductor or system.

This method is defined as follows:

1. SyncReconfig is transmitted in principle over all connected buses of a PAE (data buses and/or trigger buses), even over the buses which are not currently (in the current cycle) transmitting any data and/or triggers.

2. In order for a PAE to relay SyncReconfig according to paragraph 1, first all the connected inputs of the PAE must have received SyncReconfig.

2a. Feedback in the data structure (e.g., loops) requires an exception to the postulate according to paragraph 2. Feedback coupling is excepted, i.e., it is sufficient if all the connected inputs of a PAE except those in a feedback loop have received SyncReconfig so that it is forwarded.

3. If a PAE is processing data (under some circumstances even in multiple cycles, e.g., division), then a SyncReconfig (if this is applied to the inputs according to 2 and 2a) is relayed to the receiver(s) at the point in time when the calculation and forwarding of the data and/or triggers is completed. In other words, SyncReconfig does not overtake data processing.

4. If a PAE is not processing any data (e.g., because no data is queued up at the inputs and/or there is no corresponding trigger for enabling data processing (see PACT08)) but it has received SyncReconfig at all configured inputs, then the PAE forwards SyncReconfig via all configured outputs. No data processing takes place (there is no queued-up input data and/or no enable trigger (PACT08) is queued up) and accordingly no data is transmitted further. In other words: PAEs that are not processing data relay SyncReconfig further immediately to the connected receivers but with the cycles synchronized, if necessary.

SyncReconfig is preferably transmitted together with handshake signals (e.g., RDY/ACK=reaDY/ACKnowledge). A PAE sending a SyncReconfig does not enter the reconfigurable state until all receivers have acknowledged receipt of SyncReconfig for confirmation by an ACK(nowledge).

In this method, the basic question arises as to what happens when a configuration is not yet completely configured but is already to be reconfigured again. Apart from the consideration as to whether such behavior of an application does not require better programming, the problem is solved as follows: if a PAE attempts to forward SyncReconfig to a PAE that is not yet configured, it will not receive an ACK until the PAE is configured and acknowledges SyncReconfig. This might result in a loss of performance because of waiting until the configuration of the configuration to be deleted is completed before deleting it. On the other hand, however, this is a very rare case which occurs only under unusual circumstances.

Figure 8B:
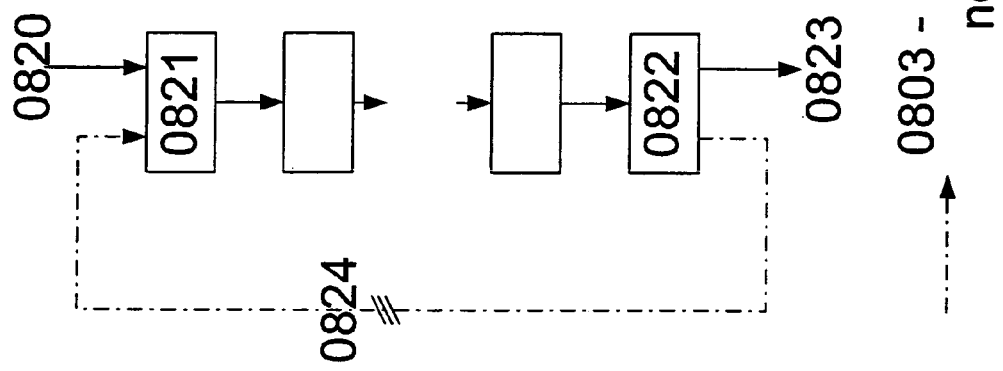
FIGS. 8a and 8b illustrate how to respond to a SyncReconfig before a configuration is not yet completely configured, according to example embodiments of the present invention.
Figure 8A:
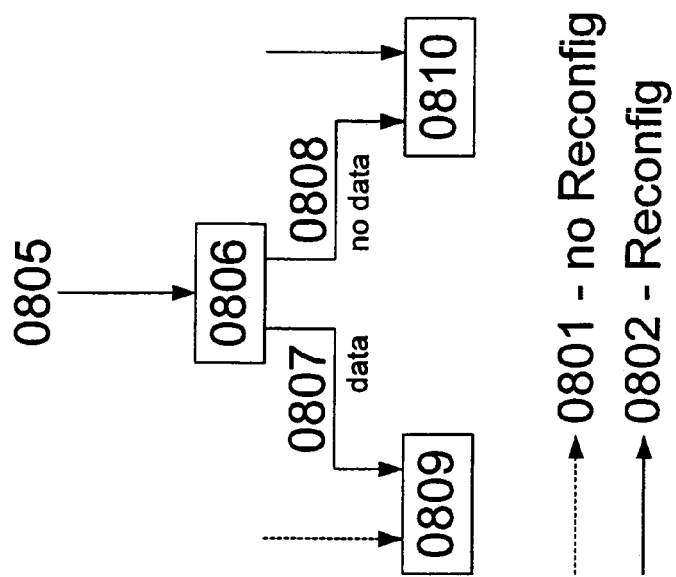

FIG. 8a shows the basic method to be used. SyncReconfig 0805 arrives at PAE 0806, which forwards a signal at the end of data processing together with data 0807. Connections that have been configured but not used during the data processing also forward the data (0808).

Although SyncReconfig arrives from 0806 via 0807 in the case of PAE 0809, SyncReconfig is still outstanding for the second input. Therefore, 0809 does not forward SyncReconfig. PAE 0810 receives SyncReconfig via 0808 but does not receive any data. Via the second input 0810 likewise receives a SyncReconfig. Although no data processing is taking place in 0810 (the data via 0808 is still outstanding), 0810 relays SyncReconfig without any result data.

FIG. 8b shows the processing of a loop. During the data processing, data is fed back (0824) from PAE 0822 to PAE 0821. At 0821 a SyncReconfig arrives via 0820. This is relayed to the downstream PAEs in the loop as far as 0822. PAE 0822 relays (0823) SyncReconfig to downstream PAEs not belonging to the loop. Neither SyncReconfig nor data is transmitted via loop feedback 0824 (see explanation 0803).

0801 means that no SyncReconfig has been transmitted on this bus at the point in time depicted as an example. 0801 implies no information regarding whether data/triggers have been transmitted.

0802 means that a SyncReconfig has been transmitted on this bus at the point in time depicted as an example. 0802 does not imply any statement regarding whether data/triggers have been transmitted.

0803 means that in the case of occurrence of a SyncReconfig at the data transmitter (in this example 0822), no SyncReconfig is transmitted on this bus (regardless of the point in time). 0802 implies that no data/triggers are transmitted.

7. Alternative Protocoling

A protocol is described below as an alternative to the known RDY/ACK data flow control protocol. It secures data streams even when registers are inserted between the transmitter and receiver at high clock frequencies. To this end, suitable hardware modules are also provided.

Reusable transmitter and receiver units are extracted for these modules, in particular for the communication between an XPP processor field and an XPP configuration controller. These modules and their code are also described below. It should be pointed out that these modules may in part replace and/or supplement XPP-FILMO modules such as those which have been used previously.

Figure 9:
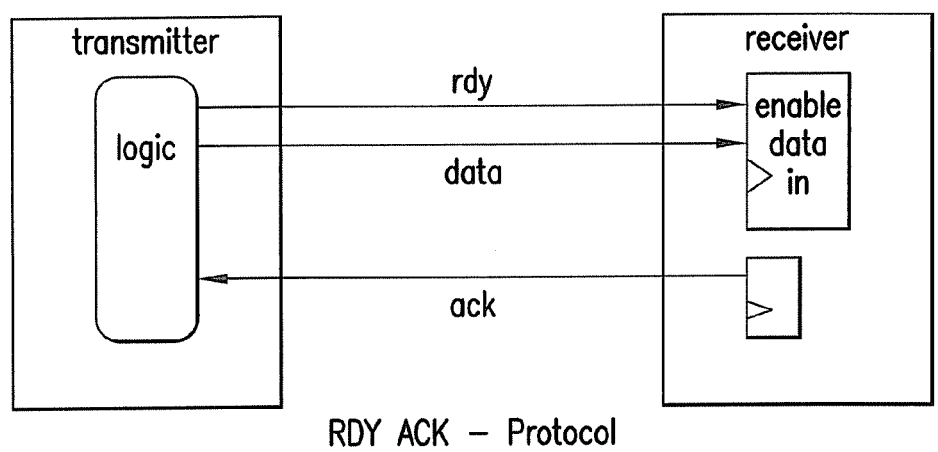
FIG. 9 illustrates an architecture implementing a RDY/ACK protocol according to an example embodiment of the present invention.

The architecture using the RDY/ACK protocol is shown in FIG. 9.

The transmitter must wait for pending ACKs before a RDY signal is assigned. This means that the longest path which determines the frequency of such a system is the path from the receiver to the transmitter, specifically via the logic of the transmitter and back to the receiver and its register enable logic.

Figure 10:
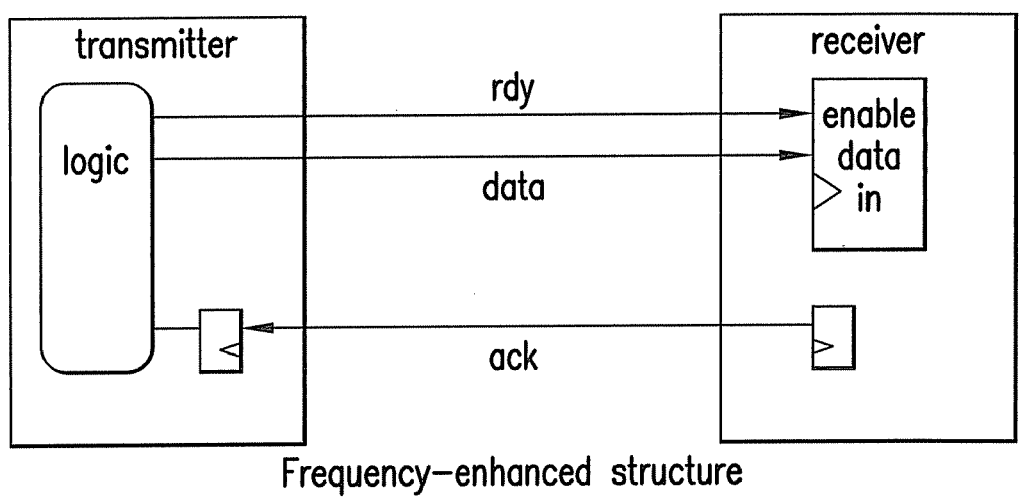
FIG. 10 illustrates a modified architecture implementing a RDY/ACK protocol according to an example embodiment of the present invention.
Figure 11:
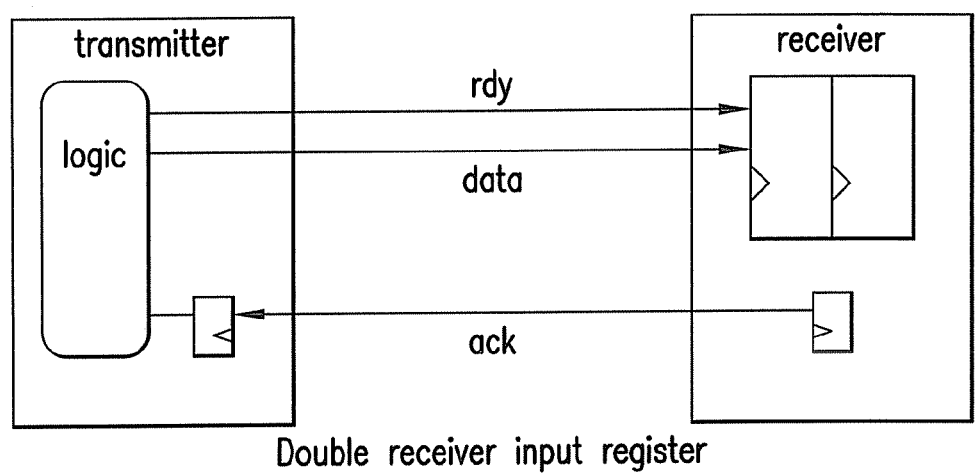
FIG. 11 illustrates an architecture including a double receiver input register, implementing a transmitter/receiver protocol according to an example embodiment of the present invention.

An inserted register at the input of the transmitter as shown in FIG. 10 shortens the longest path but the logic must wait one cycle longer for pending ACKs. The data transmission rate is reduced to every second clock cycle. This is also true when the pipeline register is not provided at the ACK input but instead at the RDY and data output.

A second problem occurs when the protocol is used on the PINS or the I/O interface of an XPU. The XPU may be correctly configured and may send a data packet outward. This means that it sends a RDY. Under the assumption that the connected circuit is not in a position to receive data because it is not connected or is not completely programmed, the RDY will be lost and the XPU will be stopped. Later when the connected circuit outside of the XPU is in a position to receive data, it will not respond because it will not send an ACK without having received a RDY.

8. First Approach Using the Credit FIFO Principle

The Credit FIFO idea presented here solves the problem of the reduced throughput with a FIFO in the receiver input. The transmitter is always allowed to send another packet if at least one ACK is pending.

This means that when the transmission begins the first time, two packets are sent without knowing whether or not they will be confirmed (acknowledged). Thus the second problem mentioned in the preceding section still exists.

Figure 12:
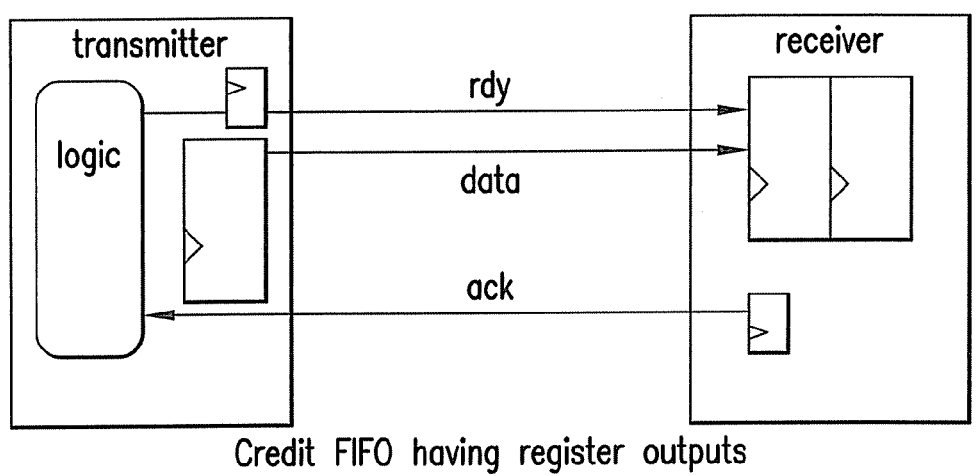
FIG. 12 illustrates a modified architecture implementing a protocol between a transmitter and receiver, where all modules have registers at the output, according to an example embodiment of the present invention.
Figure 13:
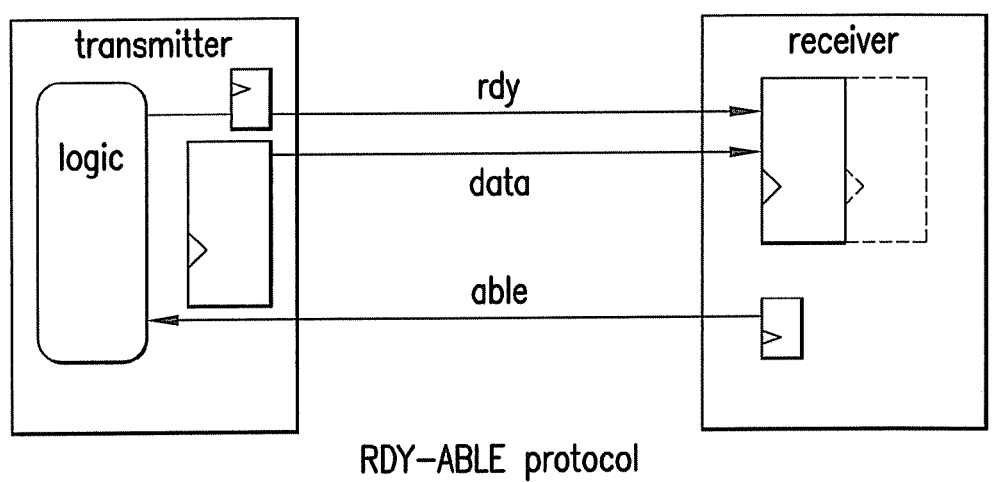
FIG. 13 illustrates an architecture implementing a RDY-ABLE protocol according to an example embodiment of the present invention.
Figure 14:
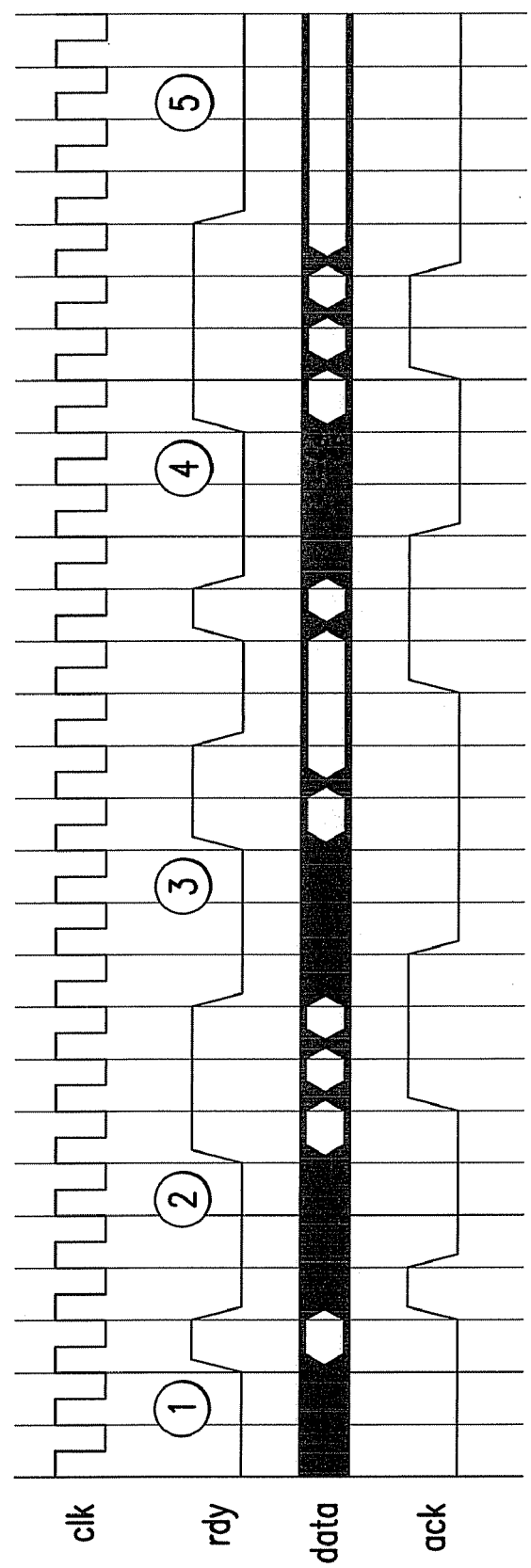
FIG. 14 shows a bus signal between a transmitter and a receiver using credit system timing.

FIG. 12 shows one alternative. The protocol between the transmitter and receiver is the same but all modules have registers in the outputs as a design variant. This is useful for synthesis estimates and time response estimates. The latter architecture does not require more hardware than the former because a data register must also be present in the former variant.

According to another novel proposal, the semantics of the ACK signal is changed to the meaning of "would issue an ACK," i.e., it shows the ability to receive data. Therefore these signals are called "ABLE" signals. FIG. 5 shows the version in which there are registers at all module outputs.

The transmitter may always send data in the direction of the receiver if allowed by the ABLE signal. This protocol may then disable the second register in the receiver part if it is certain that the transmitter is holding the transmitted data in a stable stall situation until the receiver signals "ABLE" again.

9.1 Protocol Evaluation—Credit System Semantics

The credit system has the following semantics: Transmitter: "I am allowed here to send two data packets and as many additional packets as I receive acknowledgments for. If I am not allowed to send another packet, then the last data value must remain valid on the BUS."

Receiver: "Each received packet will be acknowledged as soon as I am able to receive others."

9.2 RDY-ABLE Semantics

The RDY-ABLE protocol has the following semantics: Transmitter: "If the ABLE signal is "high," I am allowed to send a data packet which is also valid, with a ready signal being on the connection bus during the entire next cycle. If the ABLE signal is "low," then I must ensure that the instantaneous data will remain on the bus for another cycle."

Receiver: "ABLE will always be assigned to the connecting bus for the entire next cycle if I am certain that no incoming data packet is lost."

There may be a number of variants for implementing the RDY-ABLE protocol, e.g., pulsed RDY-ABLE or RDY-ABLE having pulsed data. The meanings of high and low may be the opposite of those described above. For pulse-like protocols, each data packet must be valid for only one cycle. This variant needs one more input register in the receiver and may be useful if the bus between the transmitter and receiver is used by more than one connection or possibly is used bidirectionally. Certain IO additions to XPU architectures may be one example of this.

Comparison

In situations where the number of credits is not known to the transmitter the credit system is more stable, whereas RDY-ABLE has the advantage that data is not sent until the receiver is in a position to receive data. RDY has an ACK-time curve with a credit system. FIG. 6 shows the bus signal between a transmitter and a receiver in a credit system having RDY/ACK protocol. Five cases are outlined below:
1. Transmission of a single packet
2. Streaming
3. Receiver is not immediately ready to receive
4. Receiver is able to receive only at the beginning
5. Receiver is not ready to receive additional data, e.g., because it has not been reconfigured or it is unable to supply any additional data to the next receiver.

Figure 15:
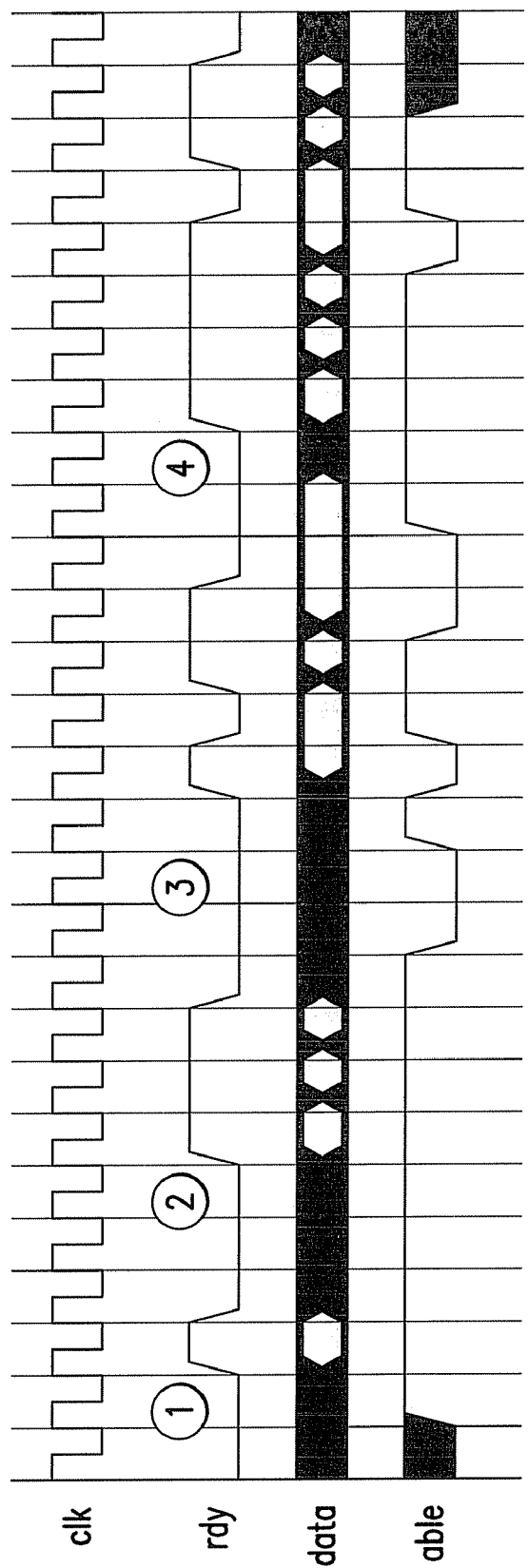
FIG. 15 shows a bus signal between a transmitter and a receiver using a RDY protocol.

2.5 FIG. 15 Shows the Bus Signal Between a Transmitter and a Receiver Using the RDY Protocol.

Four cases are outlined:
1. Transmission of a single packet "I am allowed while ABLE is active."
2. Streaming is consistently high during ABLE.
3. The transmitter transmits regardless of the ability of the receiver to receive data.
4. The transmitter stops the flow for one cycle.

Figure 16:
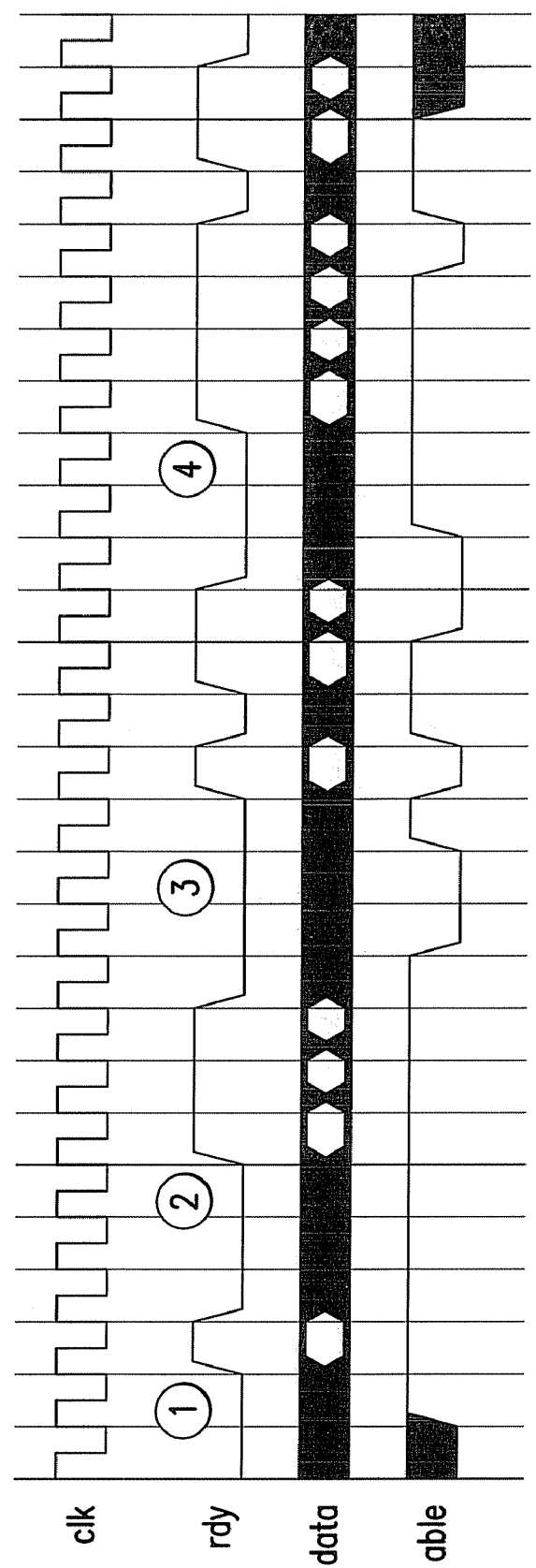
FIG. 16 shows a bus signal where a pulsed RDY-ABLE protocol is used.

To make the communication bus free for other users more frequently, the pulsed RDY-ABLE protocol may be used. However, it is not the standard when simpler hardware is desired because it increases the hardware complexity by the addition of one register. Reference may be made to FIG. 16 for the comparison.

Figure 17:
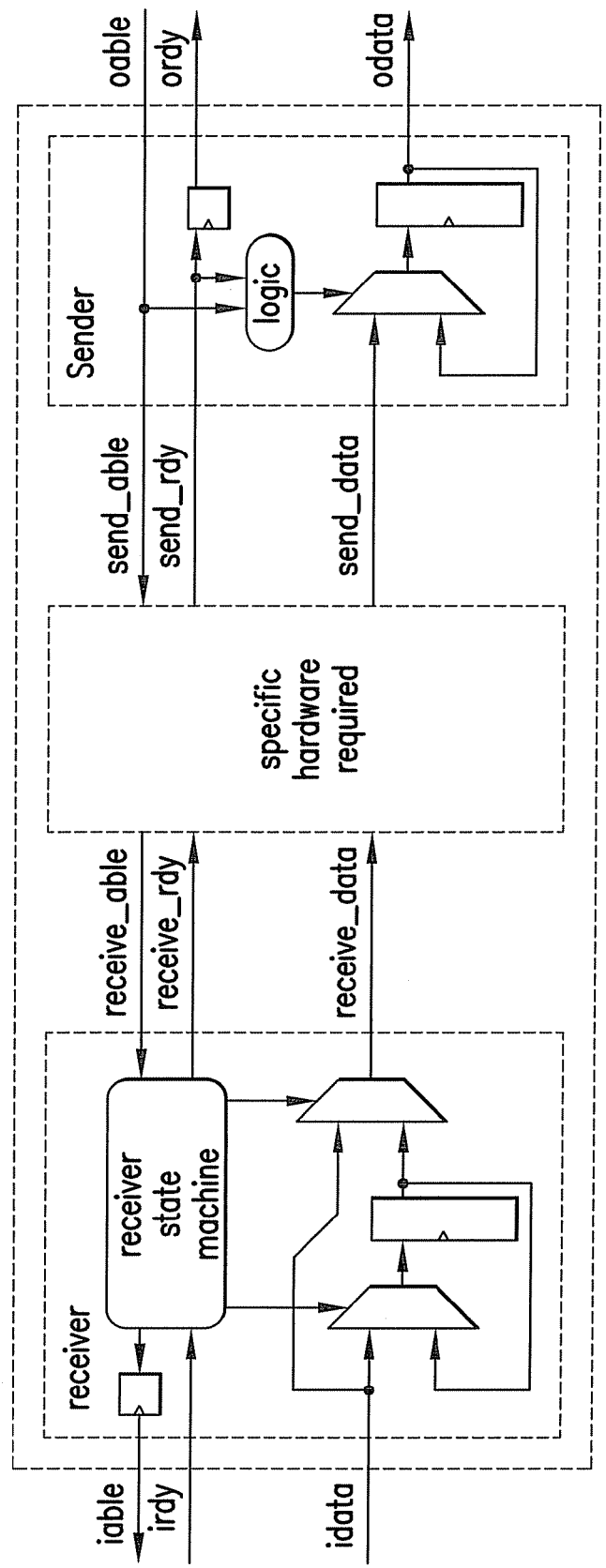
FIG. 17 shows hardware for receiving and sending data using a RDY/ABLE protocol according to an example embodiment of the present invention.

The hardware for RDY (FIG. 17) includes a general module which has a transmitter part and a transmitter part for data using the RDY protocol. A specific module may insert its required data processing hardware between the transmitter and the receiver unit. If the central part of FIG. 7 is omitted, then the local RDY, ABLE and data signals fit directly on top of one another on the transmitter and receiver units. The resulting module—just one transmitter and one receiver unit—is useful in a pipeline stage where many of these modules may be used between a real data producing module and a data-using module. This is useful when a transmitter and a receiver are to be connected over a great distance without having to reduce the frequency or throughput.

A module must contain not only a receiver and a transmitter, but in many cases multiple receivers and one or more transmitters will be provided in one module, e.g., and arithmetic logic unit or a dual-ported ram. This is advisable when data is generated in different ways or when data is received via another protocol. Examples may include configurable counters (without receivers) or displays (no forwarding).

Insertion of simple registers:

If the bus must have simple register stages between the transmitter and receiver, then the receiver must be increased by two registers per inserted stage. An example for this need is to provide register stages at chip boundaries, e.g., connection pieces provided with registers.

Addendum

Figure 18:
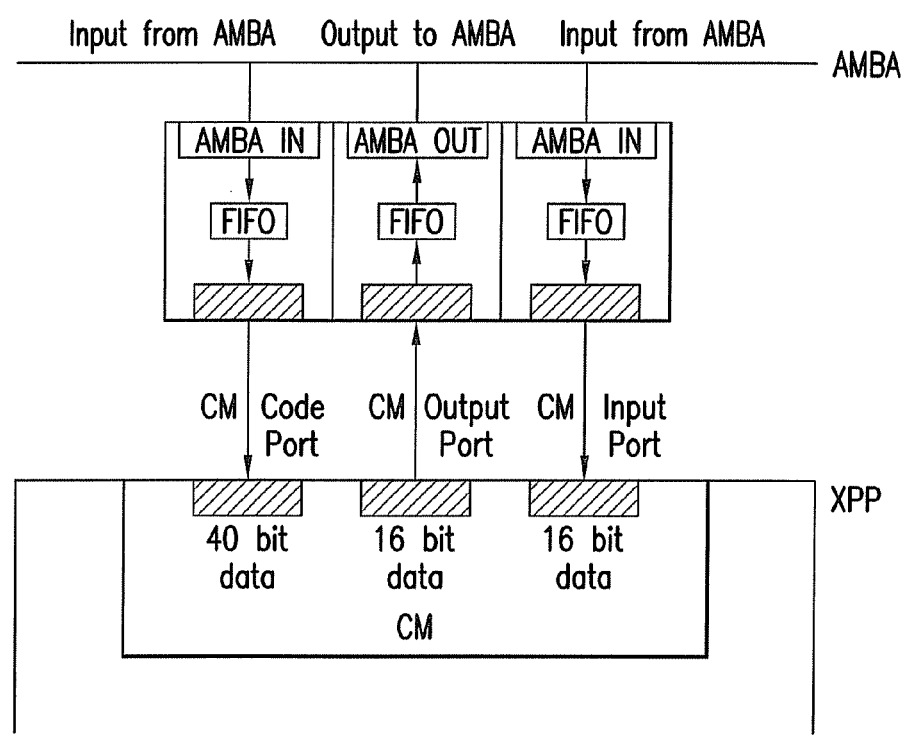
FIG. 18 illustrates an example interface arrangement of AMBA for a control manager (CM) interface of a unit having an XPP core according to an example embodiment of the present invention.

Receiver and transmitter for AMBA interfaces:

FIG. 18 illustrates one possible interface arrangement of AMBA for the CM interface of a unit having an XPP core.

For external units with the CM interface of an XPP core, the use of two modules is recommended.

Figure 19:
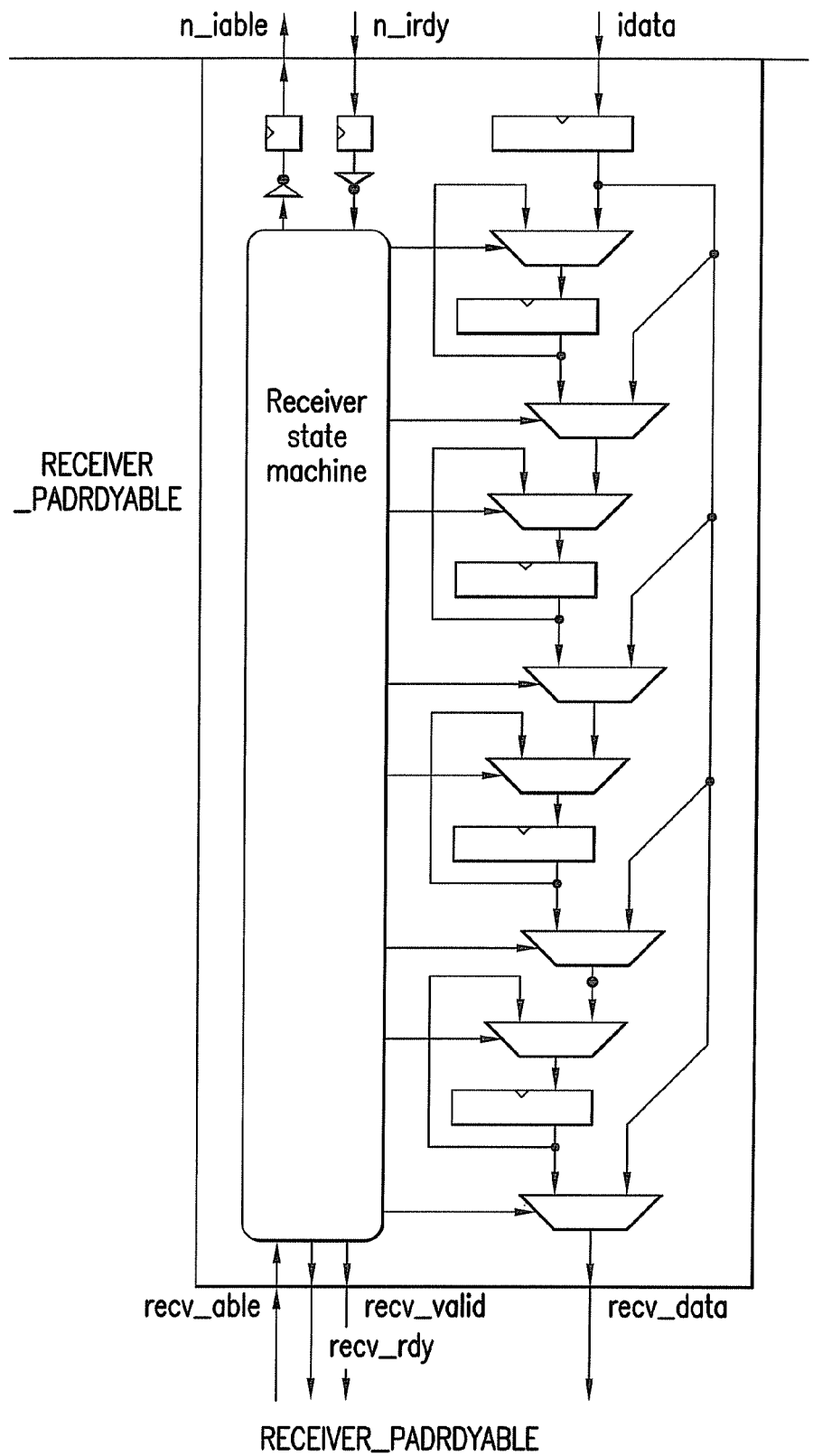
FIG. 19 shows an internal structure of a receiver part in an external interface for a 16-bit output port of the CM according to an example embodiment of the present invention.

FIG. 19 shows the internal structure of the receiver part which is required in the external interface for the 16-bit output port of the configuration manager.

The reception of data functions as follows: when the receiver module displays a 1 (HIGH) on recv_valid, then data has been received and it is instantaneously available at the recv_data output. If the surrounding module is able to receive this data, it assigns a 1 (HIGH) to recv_able. The data is then available only until the end of the same cycle. The data received next is then presented, if available.

For some circuits it may be beneficial to use the recv_rdy signal which shows that data is currently being taken from the receiver. It is an AND logic result from recv_valid and recv_able.

Transmitters in External Units

Figure 20:
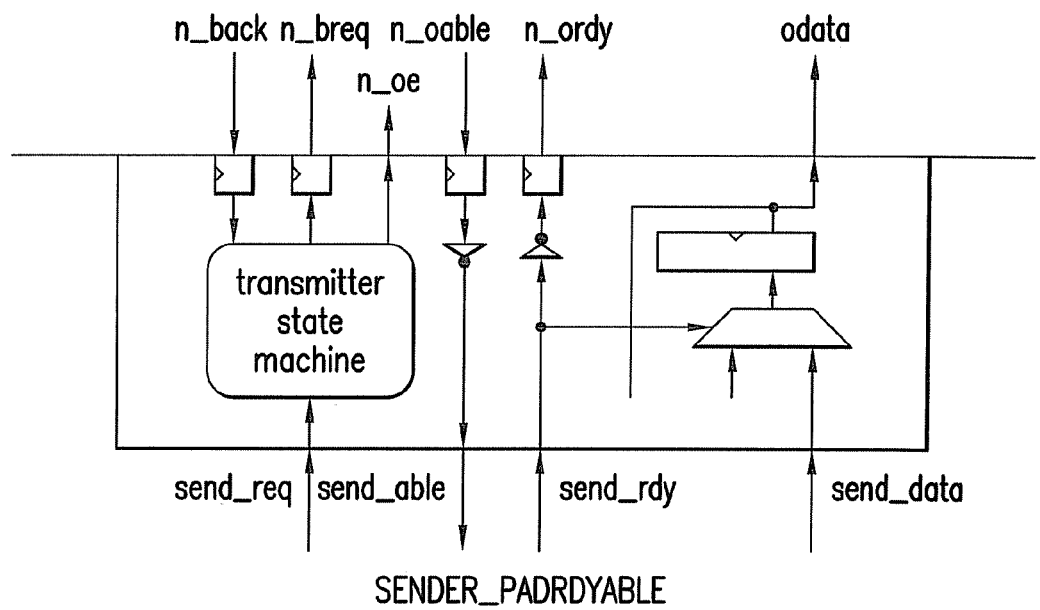
FIG. 20 shows an internal structure of a transmitter part of an external module that establishes an interface connection with the 16-bit input port of the configuration manager according to an example embodiment of the present invention.

FIG. 20 shows the internal structure of the transmitter part which is to be part of the external module that establishes an interface connection with the 16-bit input port of the configuration manager. A conventional 43-bit code word input of a CM (configuration manager) may also expect this input externally. Both versions may be available in a simulation environment.

If this module and the XPP are directly connected, the signals send_req and n_back may both be set at 0 (LOW). The n_back and n_oe are not used. Data is transmitted as follows: When the transmitter module shows a 1 (HIGH) at send_able, the send_rdy signal may be set at 1 (HIGH) namely with valid data at the send_data input. All this takes place in the same cycle. If new data is available in the next cycle, the send_rdy may be set again at 1 (HIGH), otherwise it is to be enabled; send_data need not be valid in any cycle in which send_rdy is 0 (LOW).

| Reference list | |
|---|---|
| PACT01 | P 44 16 881.0-53 |
| PACT02 | PCT/DE97/02949 |
| PACT03 | PCT/DE97/03013 |
| PACT04 | PCT/DE97/02998 |
| PACT05 | PCT/DE97/02999 |
| PACT06 | 197 04 044.6-53 |
| PACT07 | PCT/DE98/00456 |
| PACT08 | PCT/DE98/00334 |
| PACT09 | PCT/DE98/03682 |
| PACT10 | PCT/DE99/00504 |
| PACT10 | PCT/DE99/00505 |
| PACT11 | PCT/EP02/10065 |
| PACT12 | PCT/DE99/00639 |
| PACT13 | PCT/DE00/01869 |
| PACT14 | PCT/EP01/08534 |
| PACT15 | PCT/EP02/02398 |
| PACT16 | 102 06 857.7 |
| PACT16 | 102 40 000.8 |
| PACT17 | PCT/EP01/06703 |
| PACT18 | PCT/EP02/02403 |
| PACT19 | PCT/DE03/00152 |
| PACT20 | PCT/EP02/06865 |
| PACT21 | PCT/DE02/03278 |
| PACT22 | PCT/EP01/11299 |
| PACT24 | EP 01 102 674.7 |
| PACT25 | PCT/EP02/02402 |
| PACT26 | EP 01 129 923.7 |
| PACT27 | 02 027 277.9 |
| PACT28 | PCT/EP02/10084 |
| PACT29 | 102 12 622.4-53 |
| PACT29 | 102 19 681.8 |
| PACT30 | 102 36 271.8 |
| PACT30 | 102 38 174.7-53 |
| PACT31 | PCT/EP02/10572 |
| PACT32 | PCT/EP02/10479 |
| PACT33 | 102 36 272.6 |
| PACT33 | 102 38 173.9 |
| PACT34 | 102 41 812.8 |
| PACT36 | 102 36 269.6 |
| PACT36 | 102 38 172.0 |
| PACT37 | 102 43 322.4 |
| PACT39 | EP 02 022 692.4 |
| PACT40 | 103 00 380.0 |

What is claimed is:

1. A processor chip, comprising:
a bus structure; and
a multidimensional field of cells;
wherein:
for each of at least some of the cells, a respective switch is dedicated to the respective cell for dynamically establishing an interconnection over the bus structure and between the respective cell and another of the cells, data being transferable from a transmitting one of the interconnected cells to a receiving one of the interconnected cells via the interconnection;
the processor chip is adapted for at least one of the transmitting and receiving cells to automatically verify a validity of the interconnection; and
the interconnection is established conditional upon the verification of the validity.

2. The processor chip of claim 1, wherein the interconnection is established conditional upon approval of the interconnection by both of the transmitting and receiving cells.

3. The processor chip of claim 1, wherein the cells are coarsely granular logic cell units.

4. The processor chip of claim 3, wherein each of at least one of the coarsely granular logic cell units includes an arithmetic logic unit.

5. The processor chip of claim 1, wherein the verification of the validity of the interconnection depends on an availability of resources required for the interconnection.

6. The processor chip of claim 5, wherein the resources on whose availability the validity of the interconnection depends includes at least two of the transmitting cell, the receiving cell, and a bus segment of the bus structure.

7. The processor chip of claim 6, wherein the validity of the interconnection is analyzed based on identifiers assigned to at least one of the transmitting cell, the receiving cell, and the bus segment.

8. The processor chip of claim 7, wherein the validity of the interconnection is further analyzed based on an identifier assigned to a currently processed application.

9. The processor chip of claim 6, wherein the cells are coarsely granular logic cell units.

10. The processor chip of claim 9, wherein each of at least one of the coarsely granular logic cell units includes an arithmetic logic unit.

11. The processor chip of claim 5, wherein the cells are coarsely granular logic cell units.

12. The processor chip of claim 11, wherein each of at least one of the coarsely granular logic cell units includes an arithmetic logic unit.

13. The processor chip of claim 1, wherein each of the transmitting and receiving cells stores therein an identification of a configuration to which the respective cell is assigned, and the verification of the validity is performed by comparing the identifications.

14. The processor chip of claim 1, wherein the bus structure includes:
a plurality of bus segments;
two switches at an interface between two adjacent ones of the plurality of bus segments;
a first one of the switches is controllable by a first one of the two adjacent ones of the plurality of bus segments; and
a second one of the switches is controllable by a second one of the two adjacent ones of the plurality of bus segments.

15. The processor chip of claim 1, wherein the cells are reconfigurable data processing elements.

16. The processor chip of claim 1, wherein the verification includes verifying whether there is a relationship between the transmitting and receiving cells rendering them suitable for connection to each other.

17. The processor chip of claim 16, wherein the verification is performed in response to a configuration of the interconnection.

18. The processor chip of claim 1, wherein the cells include at least one of data processing elements and memory elements.

* * * * *